(12) United States Patent
Fu

(10) Patent No.: US 6,288,725 B1
(45) Date of Patent: Sep. 11, 2001

(54) REPRESENTATION AND RESTORATION METHOD OF FONT INFORMATION

(76) Inventor: Zining Fu, 2448 Kettle Dr., Troy, MI (US) 48083

( * ) Notice: Subject to any disclaimer, the term of this patent is extended or adjusted under 35 U.S.C. 154(b) by 0 days.

(21) Appl. No.: 09/171,780

(22) PCT Filed: Feb. 24, 1997

(86) PCT No.: PCT/US97/02692

§ 371 Date: Apr. 5, 1999

§ 102(e) Date: Apr. 5, 1999

(87) PCT Pub. No.: WO98/37495

PCT Pub. Date: Aug. 27, 1998

(51) Int. Cl.$^7$ .................................................. G06T 11/60
(52) U.S. Cl. ........................ 345/467; 345/471; 345/472
(58) Field of Search .................................. 345/467, 433, 345/471, 469, 194, 144, 472, 418, 124, 142, 16, 17; 707/535; 382/258, 259, 185

(56) References Cited

U.S. PATENT DOCUMENTS

| | | | |
|---|---|---|---|
| 4,398,311 | * | 8/1983 | Spitz ............................................ 5/13 |
| 4,931,953 | * | 6/1990 | Uehara et al. ......................... 345/467 |
| 4,933,866 | * | 6/1990 | Markoff et al. ....................... 345/471 |
| 5,018,217 | * | 5/1991 | Yoshida et al. ....................... 382/266 |
| 5,305,433 | * | 4/1994 | Ohno ..................................... 345/469 |
| 5,870,107 | * | 2/1999 | Fujisawa et al. ..................... 345/467 |
| 5,909,221 | * | 6/1999 | Nakai et al. ........................... 345/433 |
| 5,917,501 | * | 6/1999 | Muller et al. ......................... 345/467 |
| 5,920,324 | * | 7/1999 | Hasegawa et al. ................... 345/467 |

FOREIGN PATENT DOCUMENTS

| | | |
|---|---|---|
| 88102466A | 4/1988 | (CN) . |
| 88100794A | 9/1988 | (CN) . |
| 931076036A | 9/1993 | (CN) . |
| 951105762A | 7/1995 | (CN) . |

OTHER PUBLICATIONS

Adobe Systems Corporation, Postscript Language Reference Manual, 1990, Edition 2, P393, Addision–Wesley, USA.

* cited by examiner

*Primary Examiner*—Matthew Luu
*Assistant Examiner*—Thu-Thao Havan

(57) ABSTRACT

Font information includes the stroke type, the skeleton point and the stroke tip type information (Types I, II, and III) shared by various kinds of font variants. Each variant is added with horizontal and vertical stroke widths, and the stroke shape control information (803 and 805–810) expressed as their functions. The stroke skeleton point widening (Wx, Wy, Wz, Wr, and Wt) and the follow-up information, the stroke width non-linear scaling information and the composite stroke information of the primary character style based on the scaling proportion and the space occupation information can be added. The restoration method includes processes, such as the determination of the stroke shape control information and the outline control information, the widening adjustment of the skeleton points, the determination of the follow-up points, the adjustment of the present stroke width, the isometric adjustment of the composite strokes, and the re-adjustment of the stroke width, which avoids strokes merging together.

17 Claims, 19 Drawing Sheets

| FONT CODE | FONT INFORMATION LENGTH |
|---|---|
| X DIMENSION: LX | Y DIMENSION: LY |
| CONCAVITY-CONVEXITY INFORMATION AREA | STROKE NUMBER M |

Stroke 1 Area:

| STROKE 1 TYPE IDENTIFICATION ||||
|---|---|---|---|
| STROKE TIP 1 TYPE IDENTIFICATION | STROKE TIP 2 TYPE IDENTIFICATION | | STROKE TIP F1 TYPE IDENTIFICATION |
| SKELETON POINT 1 WIDENING IDENTIFICATION | SKELETON POINT 2 WIDENING IDENTIFICATION | | SKELETON POINT G1 WIDENING IDENTIFICATION |
| SKELETON POINT 1 FOLLOW-UP IDENTIFICATION | SKELETON POINT 2 FOLLOW-UP IDENTIFICATION | | SKELETON POINT G1 FOLLOW-UP IDENTIFICATION |
| DATA 1 AREA ||||
| DATA 2 AREA ||||
| ..... ||||
| DATA N1 AREA ||||

Stroke 2 Area:

| "R1" STROKE IDENTIFICATION ||
|---|---|
| LEFT LOWER STROKE TIP TYPE IDENTIFICATION: TYPE II | RIGHT LOWER STROKE TIP TYPE IDENTIFICATION: TYPE II |
| LEFT UPPER SKELETON POINT WIDENING TYPE: XY FLOAT | RIGHT LOWER SKELETON POINT WIDENING TYPE: XY FLOAT |
| LEFT UPPER SKELETON POINT FOLLOW-UP IDENTIFICATION: NON FOLLOW-UP | RIGHT LOWER SKELETON POINT FOLLOW-UP IDENTIFICATION: NON FOLLOW-UP |
| LEFT UPPER CORNER HORIZONTAL COORDINATE X1: 71 ||
| LEFT UPPER CORNER HORIZONTAL COORDINATE Y1: 174 ||
| RIGHT LOWER CORNER HORIZONTAL COORDINATE X2: 185 ||
| RIGHT LOWER CORNER HORIZONTAL COORDINATE Y2: 74 ||
| ..... ||
| STROKE M AREA ||

*Fig. 2*

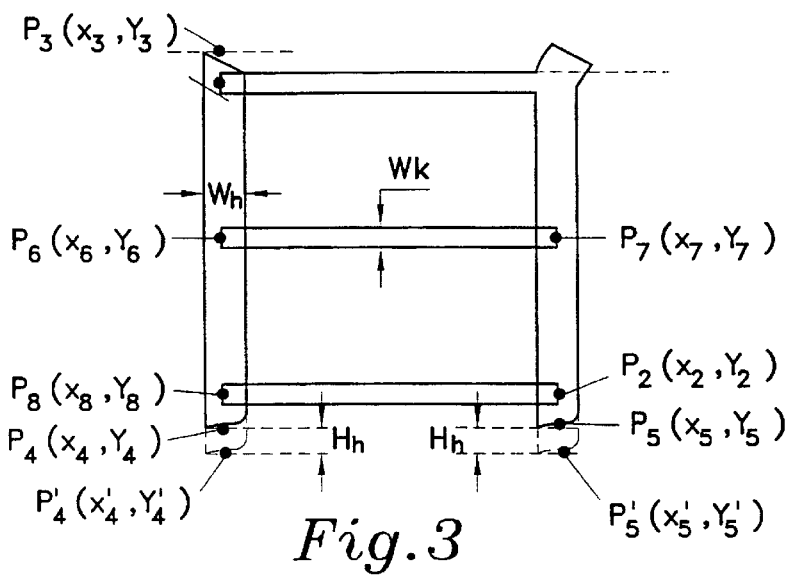
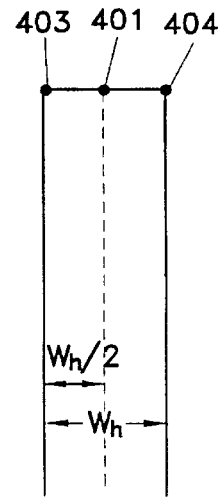
Fig.3
Fig.4A
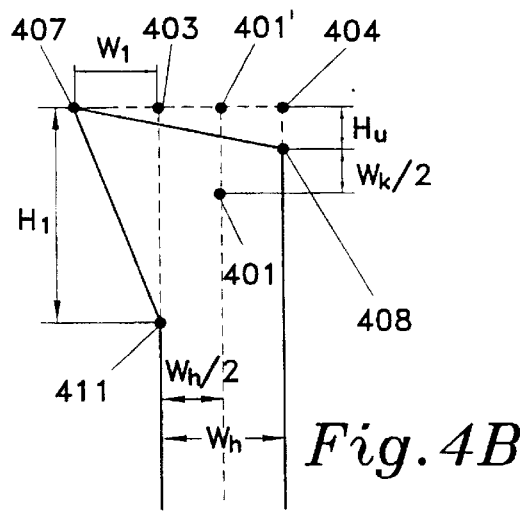
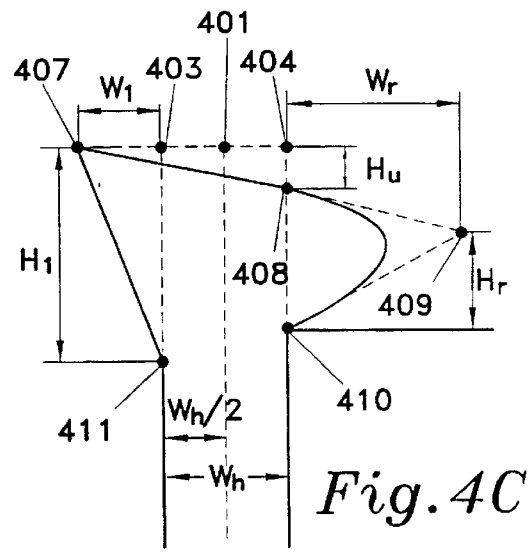
Fig.4B
Fig.4C
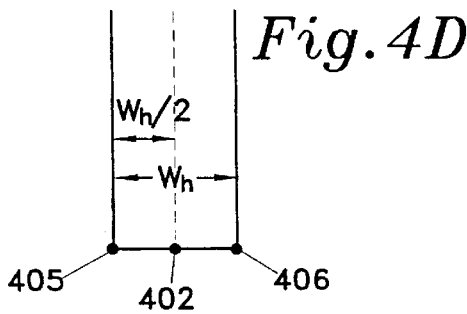
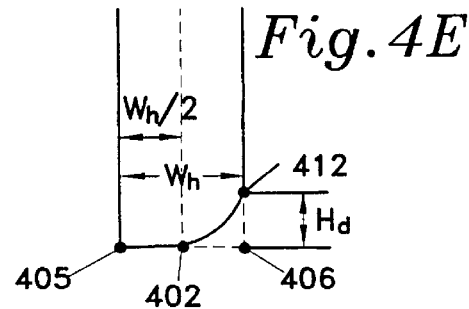
Fig.4D
Fig.4E

| Font scaling proportion K | Stroke width scaling proportion |
|---|---|
| ≥3.0 | K*1.4 |
| ≥1.5, <3.0 | K*1.2 |
| ≥0.8, <1.5 | K*1.0 |
| ≥0.4, <0.8 | K*0.8 |
| ≥0.2, <0.4 | K*0.6 |
| <0.2 | K*0.2 |

*Fig. 5A*

| X dimension: LX | Horizontal stroke width adjustment coefficient: CX | Reference horizontal stroke width | Y dimension: LY | Vertical stroke width adjustment coefficient: CY | Reference vertical stroke width |
|---|---|---|---|---|---|
| ≤256 | 1.30 | 9 | ≤256 | 1.15 | 15 |
| >256, ≤1600 | 1.00 | 7 | >256, ≤800 | 1.00 | 13 |
| >1600 | 0.71 | 5 | >800 | 0.85 | 11 |

*Fig. 5B*

| X space occupation coefficient WX | Horizontal stroke width adjustment coefficient: CX | Reference horizontal stroke width | Y space occupation coefficient WY | Vertical stroke width adjustment coefficient: CY | Reference vertical stroke width |
|---|---|---|---|---|---|
| ≤1792 | 1.30 | 9 | ≤3328 | 1.15 | 15 |
| >1792, ≤11200 | 1.00 | 7 | >3328, ≤10400 | 1.00 | 13 |
| >11200 | 0.71 | 5 | >10400 | 0.85 | 11 |

*Fig. 5C*

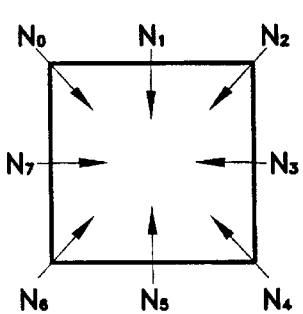
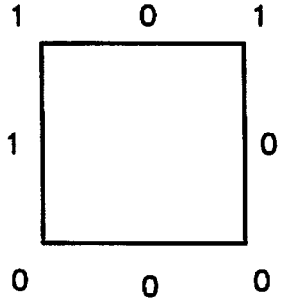
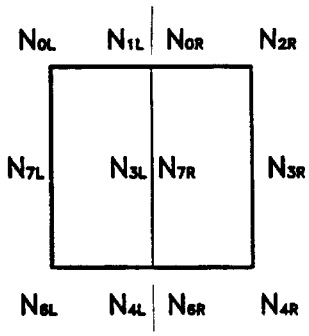

Fig.6A  Fig.6B  Fig.6C

| VERTICAL STROKE WIDTH WH | 13 |
|---|---|
| HORIZONTAL STROKE WIDTH WK | 7 |
| VERTICAL STROKE * UPPER TIP LEFT SLANTING WIDTH WI | 0.10*WH |
| VERTICAL STROKE * UPPER TIP LEFT SLANTING HEIGHT HI | 0.50*WH |
| VERTICAL STROKE * UPPER TIP RIGHT UPPER SLANTING REACH HU | 0.25*WH |
| VERTICAL STROKE * UPPER TIP RIGHT POINTING TIP OUTER REACH WR | 0.50*WH |
| VERTICAL STROKE UPPER TIP RIGHT POINTING TIP LOWER SLANTING HEIGHT HI | 0.25*WH |
| VERTICAL LOWER TIP RIGHT SLANTING HEIGHT HD | 0.25*WH |
| STROKE TIP TYPE IDENTIFICATION NUMBER OF THE VERTICAL STROKE | 2 |
| SKELETON POINT NUMBER OF THE VERTICAL STROKE | 2 |
| "PIE" STROKE UPPER END WIDTH WX | 1.50*WH |
| "PIE" STROKE MIDDLE SECTION WIDTH WZ | 0.75*WH |
| "PIE" STROKE LOWER POINTING TIP RADIUS WR | 0.10*WH |
| "PIE" STROKE RIGHT UPPER TIP OUTER POINT DISTANCE WI | 0.50*WH |
| "PIE" STROKE RIGHT UPPER TIP HEIGHT WY | 0.25*WH |
| STROKE TIP TYPE IDENTIFICATION NUMBER OF "PIE" STROKE | 1 |
| SKELETON POINT NUMBER OF THE "PIE" STROKE | 3 |
| THE LOWER END EXTENDED DISTANCE OF "RI" STROKE HH | 3.00*WK |
| STROKE TIP TYPE IDENTIFICATION NUMBER OF "RI" STROKE | 2 |
| SKELETON POINT NUMBER OF "RI" STROKE | 2 |
| ....... | ....... |

Fig.7

REPRESENTATION AND RESTORATION METHOD OF FONT INFORMATION

TECHNICAL FIELD

This invention is in the field of information processing technology and specifically is in the field of character information processing.

SUMMARY OF THE INVENTION

The compression and the restoration of information for Chinese character (Hanzi) fonts is an important subject in a field which needs to be studied and optimized. An improved representation method and restoration method of font information must possess simultaneous advantages, such as high restoration accuracy, high ratio of overall compression, high restoration speed and simplicity of font design. The current technologies are not able to meet these requirements simultaneously. Hanzi (Chinese characters) are abundant in both numbers and character fonts. For instance, Song Ti has many different styles, such as Writing Song (Shu Song), Newspaper Song (Bao Song), Title Song (Biao Ti Song) and Black Song (Hei Song); they all have similar font and stroke relationships but are differentiated from each other in stroke width, horizontal and vertical stroke width ratio and shape of stroke tip. In this case, Song Ti is called the primary font and the various fonts derived from the primary font are called the variants of the font.

According to the conventional methods, each variant is a set of new fonts and a set of fonts cannot be enlarged or reduced within an overly wide range. So that, when restoring small sized fonts, it could result in various distortions, such as strokes merging together, uneven stroke separation, inconsistency in stroke width, or loss of stroke tip. And when restoring large fonts, the strokes appear to be thin and the shape of stroke tips is not sufficiently fine sometimes provided for the small, medium and large sized characters respectively for one font type. This has multiplied the font information volume. Sometimes, the use of hint information to avoid the distortion of small sized characters also increases the font volume and makes the design more complicated.

In the advertisement and publishing industry, there are more and more fonts and font sets, requiring a processing capacity of a 30,000 to 60,000 character set. In these cases of Hanzi information processing, requiring various kinds of fonts, various sizes of characters, extra-large character sets and fonts of high accuracy, even when using the existing character representation method with a relatively high compression ratio, the font information volume is still extremely large. Improving the accuracy also increases the font volume. Therefore, fonts are required to not only have high compression ratios but also high enough accuracy. Three types of compression ratio must be comprehensively increased: Single font set compression ratio; variant consolidation compression ratio, that is to make a design putting various font variants with different stroke widths and stroke tips into one font set, and scaling overlay ratio, that is to maintain sufficient accuracy when changing sizes within a wide range. Among the above three, the variant consolidation compression ratio contributes the most to the total compression ratio and can reduce the design work load of a font set by many times over.

Presently, Bezier curves are usually used to represent cursive outlines (See "Postscript Language Reference Manual", by Adobe System Corporation, published by Addison-Wesley publishing house, the second edition, 1990. P393). This method does not have a high enough compression ratio, strokes cannot be widened, it also requires additional hint information and the font design is complicated.

Chinese patent CN1076036A(1) (Sep. 8, 1993 publication) presented a representation and restoration method of font information which presently has the highest compression ratio with the standardly split jointed font in a single font set. Using this method, the accuracy of the whole font set can be increased by increasing the representation accuracy of a few character bases, while the character bases can be represented through other suitable methods. This method requires a font representation and restoration method with controllable stroke width to represent the character bases. Its variant consolidation ratio and scaling overlay ratio depends on the character representation and restoration method used. The disadvantage of the method is that when restoring fonts using the space occupation factor proportion method, the binding between some character elements is somewhat too tight or too loose, and this is especially obvious when changing the stroke width. Use of a character element fine adjustment method will increase the font information volume. Meanwhile, because the different stroke skeleton points in the font are related to each other, when doing fine adjustment on one stroke, it is necessary to adjust the other related strokes, which will thus increase the fine adjustment information volume as well as the difficulty of the design.

According to the method in Chinese patent CN88100794A(2) (Sep. 7, 1988 publication), font information is composed of the following four parts: 1. Stroke type identification and the number and coordinates of skeleton points. 2. Stroke width. 3. Start-stop edge angle. 4. Stroke shape coefficient. At the time of restoration, the outline control point of each stroke is obtained from the above stated four types of data and the control points are connected with each stroke type according to a pre-selected method to obtain the line of outline of each stroke. The advantage is that the stroke width, the start-stop angle and the stroke tip can be controlled separately; that the stroke tip and angle can be changed only by changing the stroke tip data of the type 3 and type 4 related above; that the stroke width can be changed in a proportion which is different from the scaling proportion; and that it can produce fonts of high accuracy. The disadvantage is that the font set needs to be designed character by character; one font set can not produce many sets of fonts with larger stroke width and style differences; horizontal and vertical stroke width ratio can not be controlled separately, and one cannot prevent the strokes from merging together or avoid an uneven stroke gap. Distortion will occur especially when making strokes wider. See FIG. 15. FIG. 15 shows a font of "Jiu" after its strokes have been simply widened. The dotted lines 1509 in the figure are the edge lines of the reference font with reference stroke width [1501]. 1503 is the frame line of the font. 1507 is the left skeleton point of the upper stroke "Heng" (horizontal stroke). 1508 is the upper skeleton point of the left "Shu" (vertical stroke). 1501 and 1504 are the widths of the vertical and horizontal strokes respectively before they were widened. The excess portion 1506 of the stroke outline beyond the frame line, the vacant region 1505 occurring at the stroke joining point, a width difference 1502 between the top and bottom ends of the left hand "Shu" (vertical stroke), and the outer edge of the upper and lower strokes of the "Ri" on the right side can be observed. The opposite situation will appear when simple stroke narrowing is done. All these distortions are not acceptable. The Chinese patent CN88102466A (3) (Apr. 9, 1988 publication) presented a stroke widening method, which adds an additional stroke widening direction angle and widening widths to either side of the skeleton line and allows the widening on the two sides of the stroke skeleton line to be done with different widths at the time of restoration. This may cause another kind of distortion. Taking FIG. 15 as an example as above, if the right side of the left "Shu" (vertical) stroke is widened more than the left side in order to keep this stroke within the frame line, it may be caused to be overly close to or merge together with the "Ri" on the right side. The processes currently known in the art are not able to solve the problems stated above.

The Chinese patent CN1105762A (4) (Jul. 26, 1995 publication) explained the representation and restoration method of Chinese character (Hanzi) fonts which divides a character into three-grade structures of character, character element and stroke. In this method, the character structural type information is common to all the fonts. Compared with the patent (1), position and size information is added to each font. This method has a high compression ratio, however, due to the limited form of each stroke of each font variant (In an example of an actual application, the stroke type of one font is limited within 255), distortion in stroke representation may occur in the case of describing fonts with high accuracy. Similarly, the limited number of character element forms and the sub-fonts may also cause distortion in representation. Because the positions and sizes of the character elements of different fonts of one character are the same, when stroke width is changed, the gap between character elements will become wider for the characters with thin strokes and overly narrow or merging together for the characters with thick strokes, and the widening of the stroke cannot be completed.

When using the processes currently known in the art, since some font sets do not have stroke width control information in their font information, the strokes produced are not guaranteed to have the same width and be isometric in case of the restoration of small characters. Others contain the stroke width control information in the font information of each character in the font set, but the font set volume is increased. With the representation methods of fonts which take the characters as the representation units, every font variant of every font must be designed character by character, resulting in an overly heavy font set design work load. In addition, the user usually is neither able to control the characteristics of the produced character nor design a font set with new characteristics.

The processes currently known in the art are not able to solve the problems stated above.

DETAILED DESCRIPTION OF THE INVENTION

The purpose of the present invention is to design a representation method and a corresponding restoration method for font information which has the following: a high compression ratio; a low distortion during restoration; low font production work load; a font set which can be modified in character form or designed with new characteristics easily by users; and compatibility with the process of Chinese patent (1) and having the capacity to improve its disadvantages. Using the stroke tip control and the stroke widening method of this invention, the variant consolidation ratio and the scaling overlay ratio can be increased to a great extent and the font set of many different variants of one primary font can be combined into one font set.

In order to achieve the above goal, stroke information of each character is designed to be comprised of stroke identification information, skeleton point data and identification information of all the stroke tips in a stroke. The reference font information of each primary font is comprised of the above mentioned stroke information of each stroke of all the characters in every font and single group of stroke shapes control information of this primary font. Composite strokes can also be used to represent the commonly used stroke combinations. The various variants of a font can share the reference font information related above. Each variant includes an information group for stroke shape control. In order to realize the stroke shape control information scaling proportion which is different from the font scaling proportion, a nonlinear scaling coefficient table of stroke shape control information based on the font scaling proportion and space occupation information is provided. The space occupation information is added to the font information and the space occupation information mentioned here can be a space occupation factor or a dimension. In order to adjust character elements according to the concavity and convexity on the edges of two character elements when split joining the forms, the concavity and convexity information of font edges is also added in the font information. In order to reach the goals mentioned above, the font restoration process includes a method of obtaining related shape control information of the said stroke control information of a certain selected variant from the above mentioned stroke shape control information and a method of and the stroke restoration according to the stroke information and the shape control information related above. It also includes a process for the decomposition of composite strokes and a process for the placement of secondary strokes. Non-linear scaling procedures for stroke width and the procedure adjustment in accordance with the space occupation information can also be added. The structure of the font production process utilizes a method in which a corresponding stroke restoration process is selected based on the stroke type identification, and each primary font has a set of stroke restoration processes, including one restoration process for each type of stroke. In order to increase the quality of the multiple forms of a font, a process adjusted based on the concavity-convexity of the font compositing edge is added.

DESCRIPTION OF THE PREFERRED EMBODIMENTS

In describing a preferred embodiment of the invention illustrated in the drawings, specific terminology will be restored to for sake of clarity. However, the invention is not intended to be limited to the specific terms so selected, and it is to be understood that each specific term includes all technical equivalents which operate in a similar manner to accomplish a similar purpose.

In this specification, including claims, the tenninology "representation method" means the "compressed method". The terminology "representation" means "compression" if applicable in a statement.

The following is to explain in detail an embodiment of an actual application of this invention. The character style selected in the example of actual application is Song Ti (Song style). The resolution of the reference font selected is 256×256. The left bottom corner is taken as the origin of the coordinate system.

FIG. 2 is an example of font information structure.

FIG. 3 is a diagram of the Song Ti composite stroke "Ri".

FIGS. 4a, b, c, d and e are the shape control information and stroke type examples of the Song Ti stroke "Shu" (vertical stroke).

FIGS. 5a, b and c are stroke widening coefficient tables based on font scaling proportion, font dimension and font space occupation factor, respectively.

FIGS. 6a, b and c describe the concavity-convexity of the font periphery.

FIG. 7 is an example of stroke shape control information which records a functional relationship.

Figure 8:
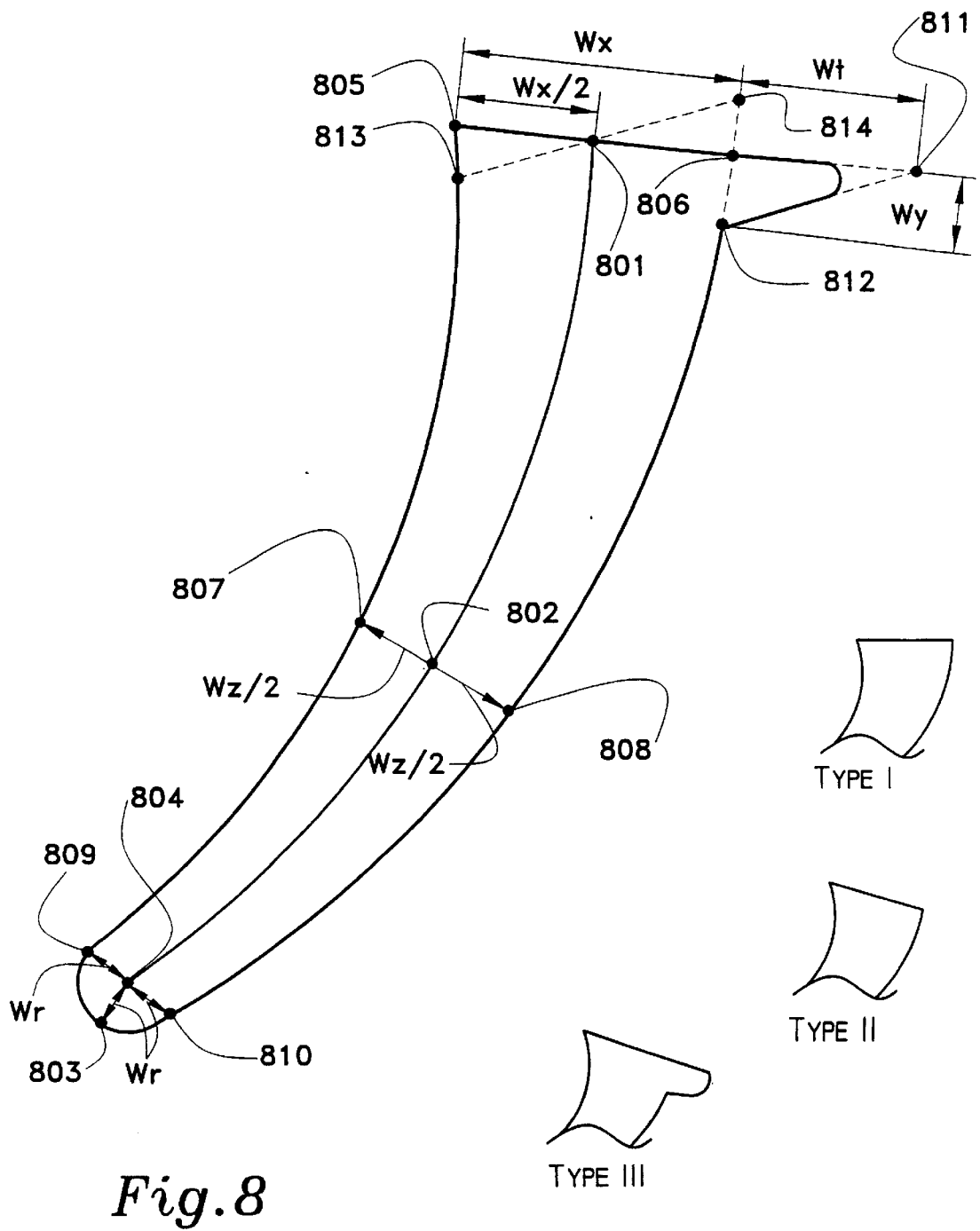

FIG. 8 is the shape control information and stroke type example of the Song Ti stroke "Pie" (left falling stroke).

Figure 9A:
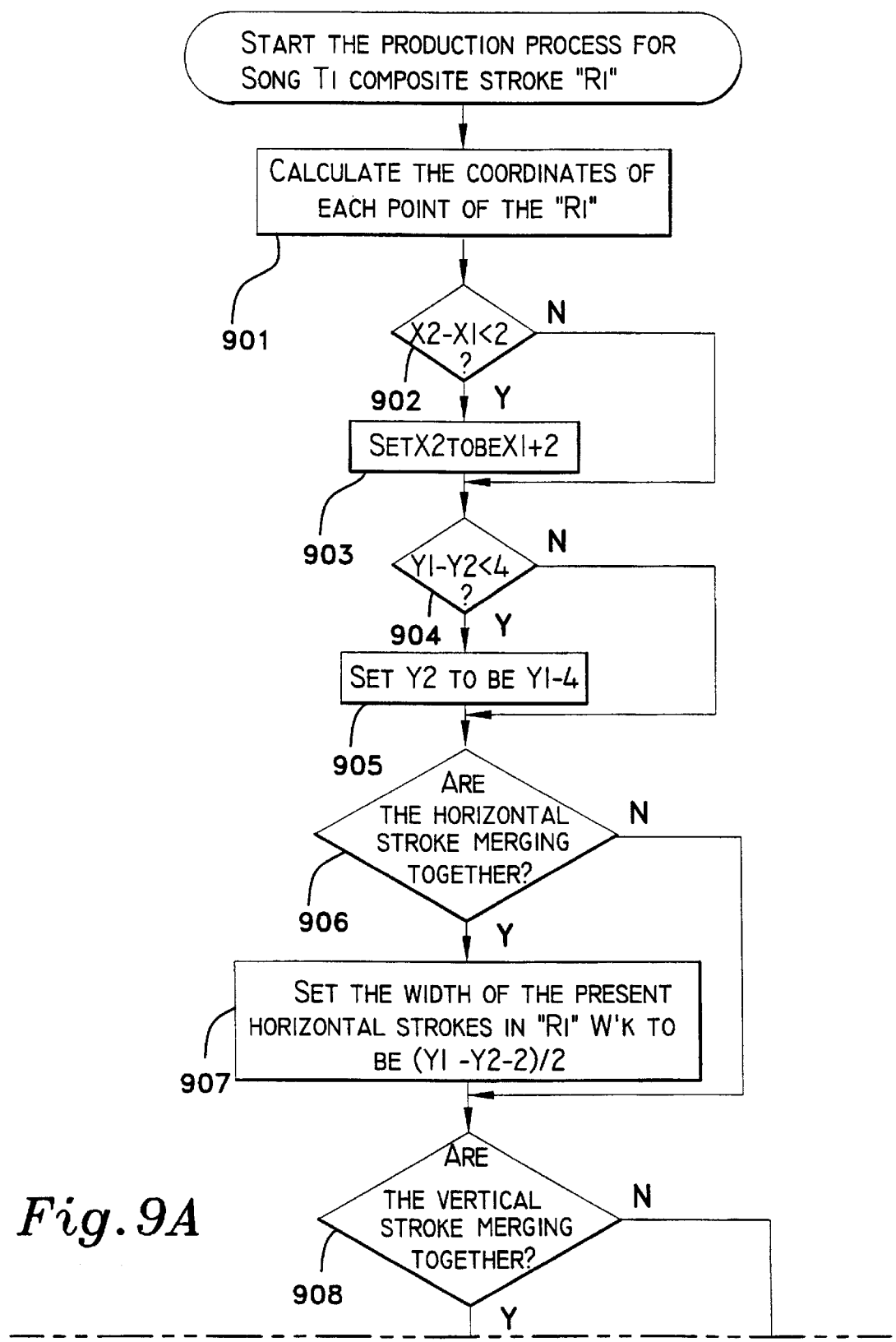
Figure 9B:
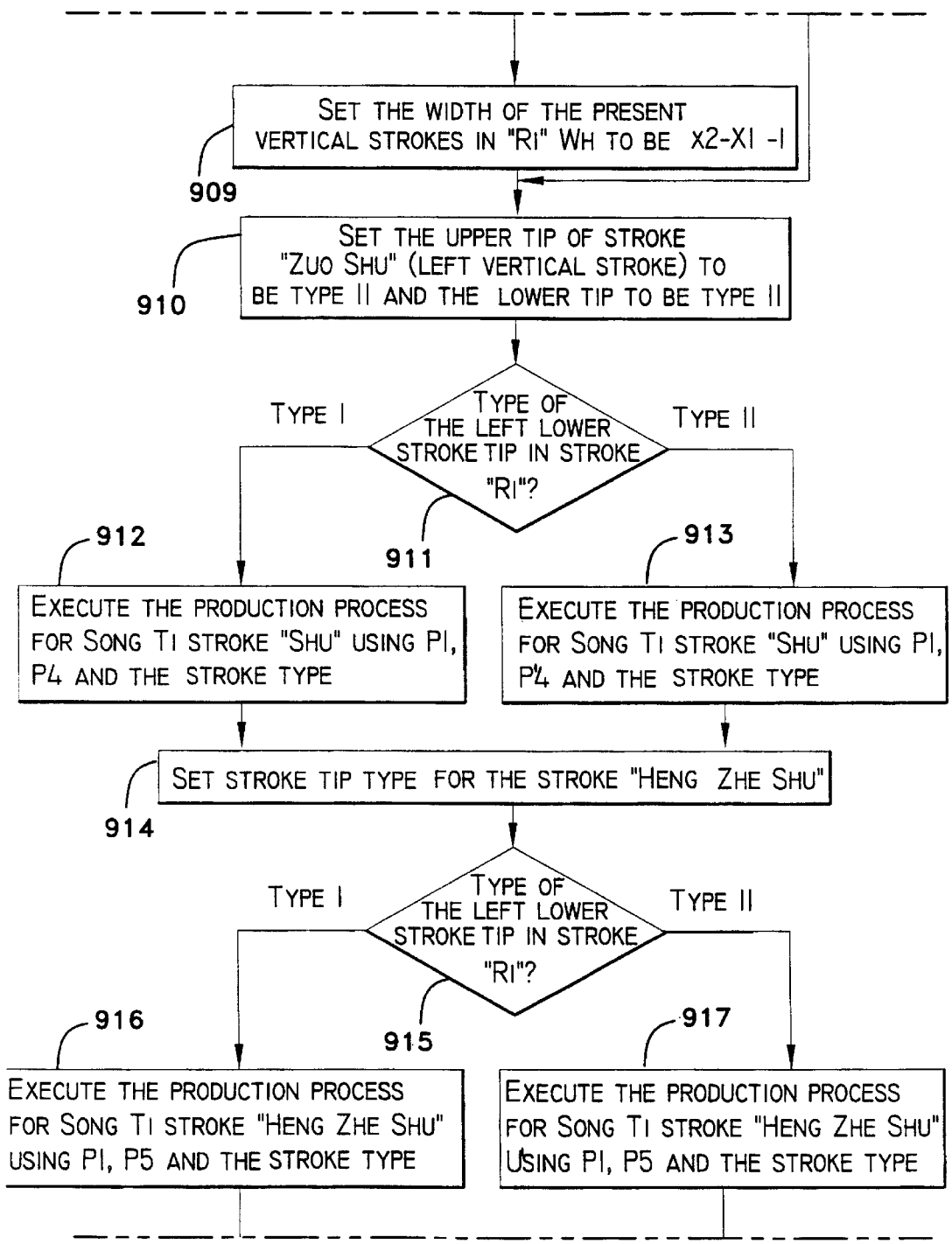
Figure 9C:
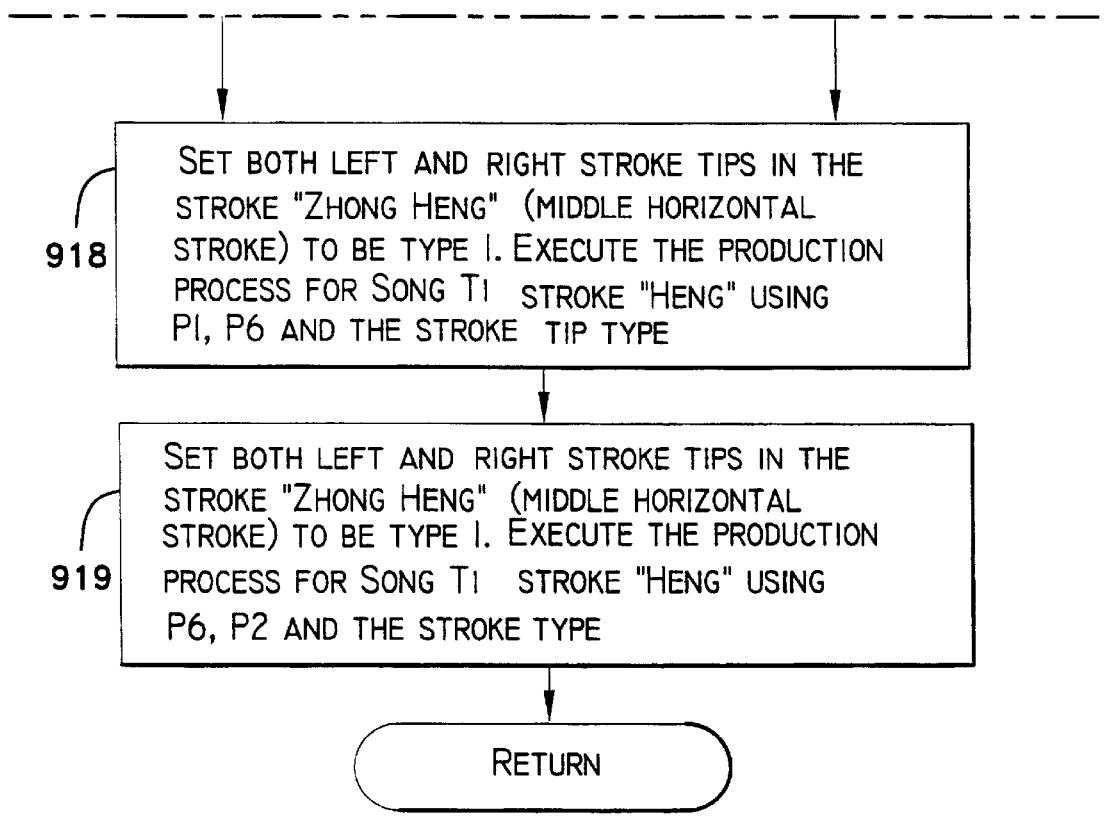

FIG. 9 is the diagram of the process to produce the Song Ti composite stroke "Ri".

Figure 10A:
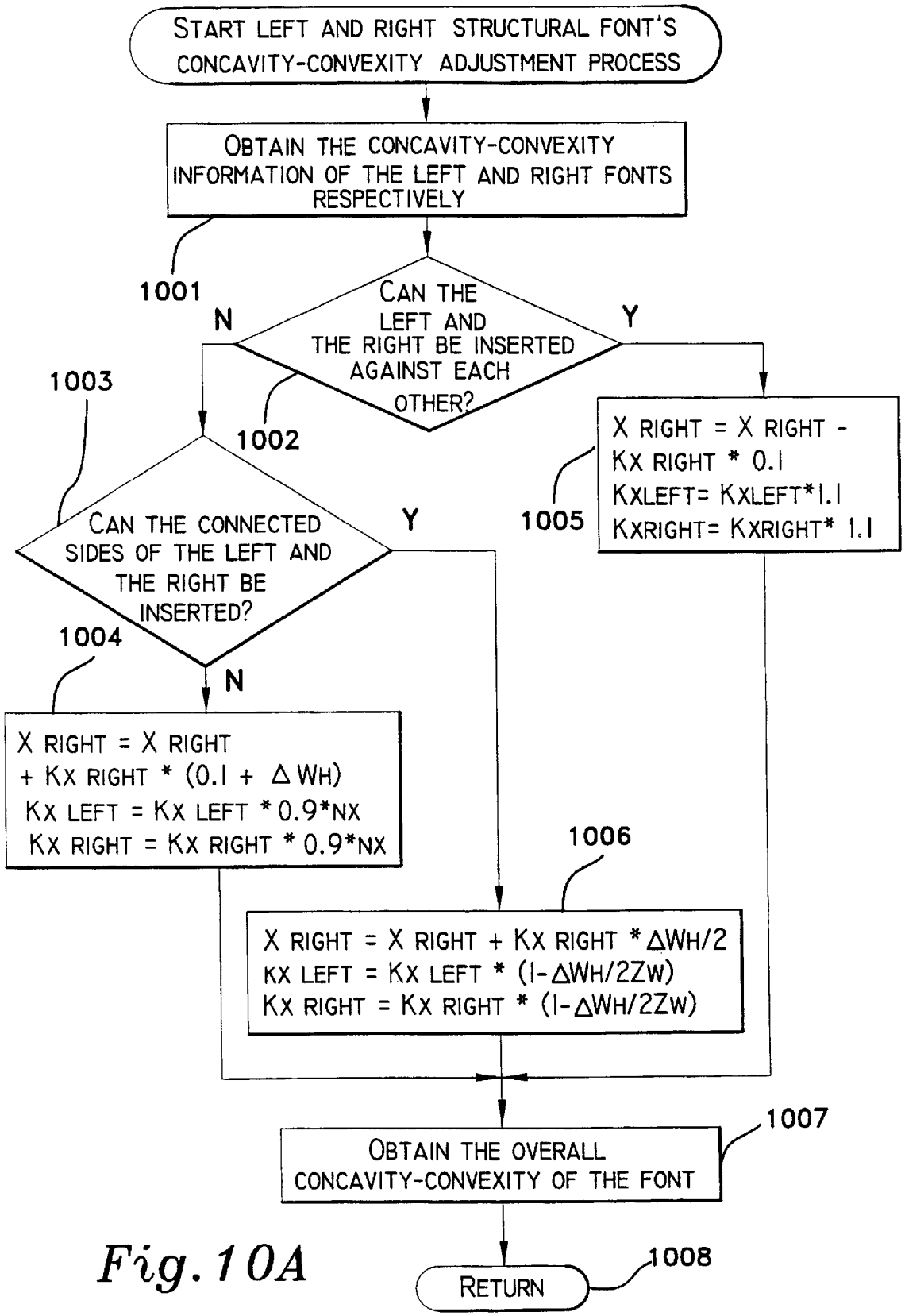
Figure 10B:
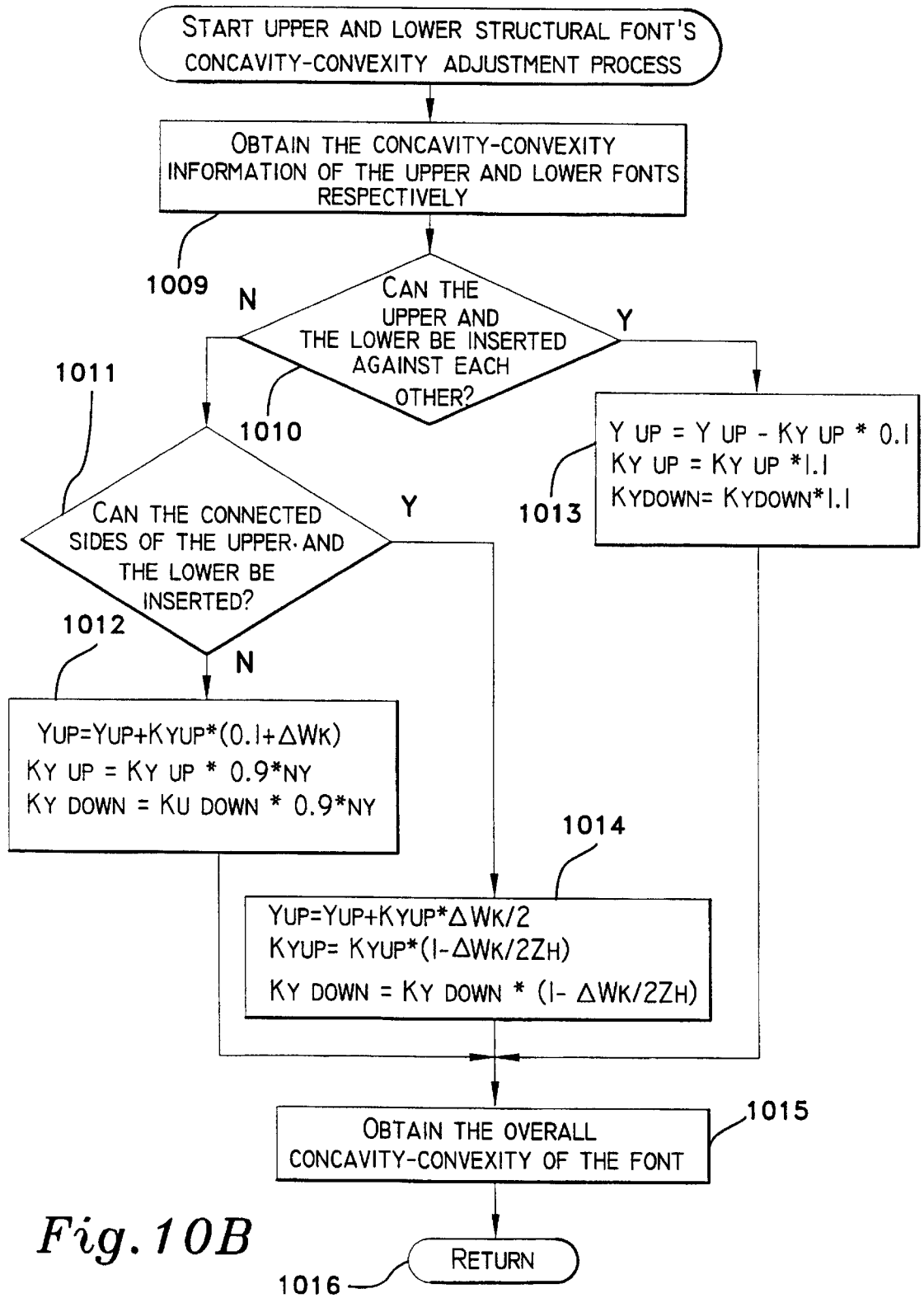

FIG. 10a and FIG. 10b are the diagrams of the font concavity-convexity adjustment process for the left and right structure and upper and lower structure respectively.

Figure 11:
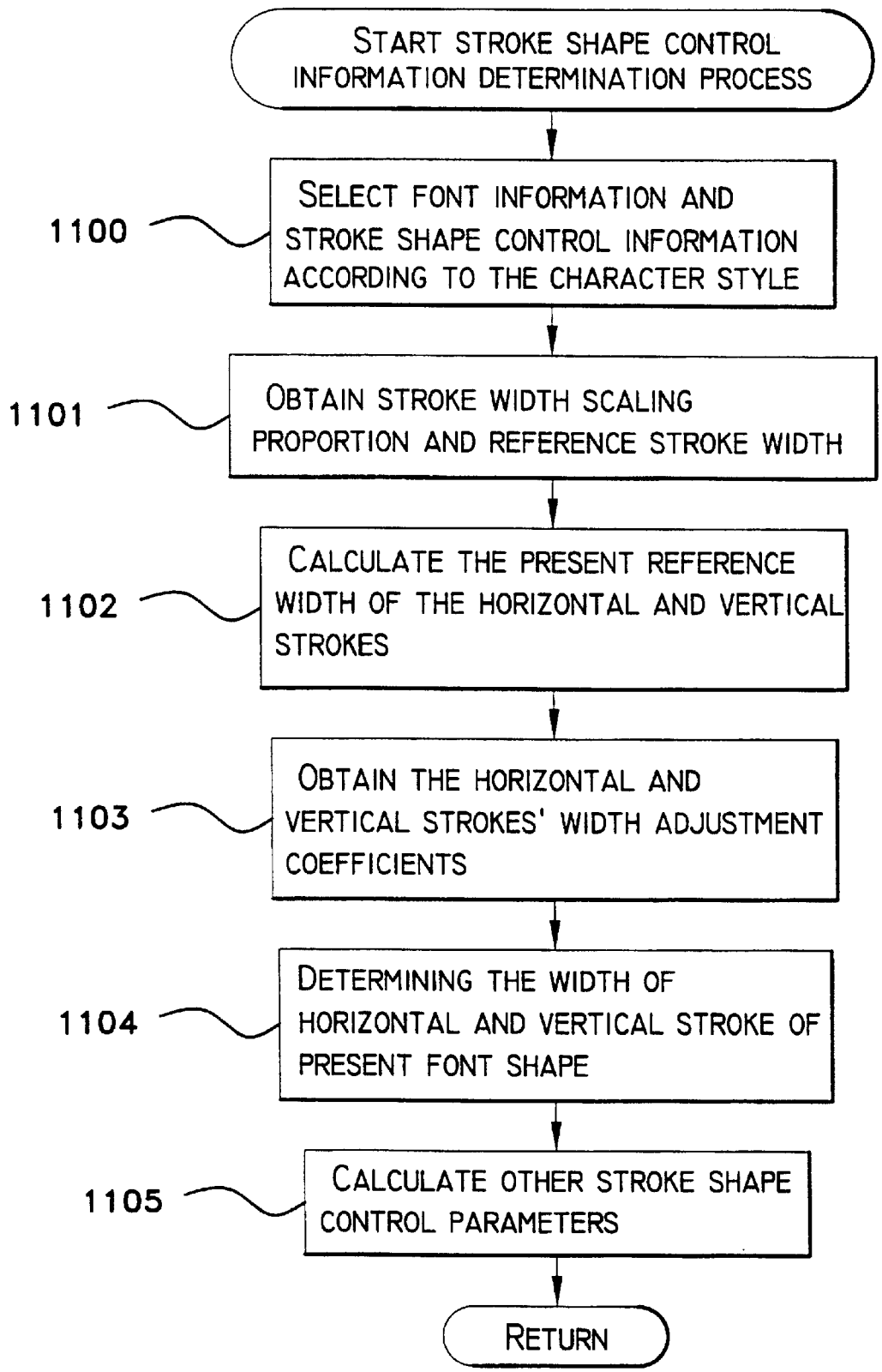

FIG. 11 is the diagram of the process to determine the stroke shape control information.

Figure 12:
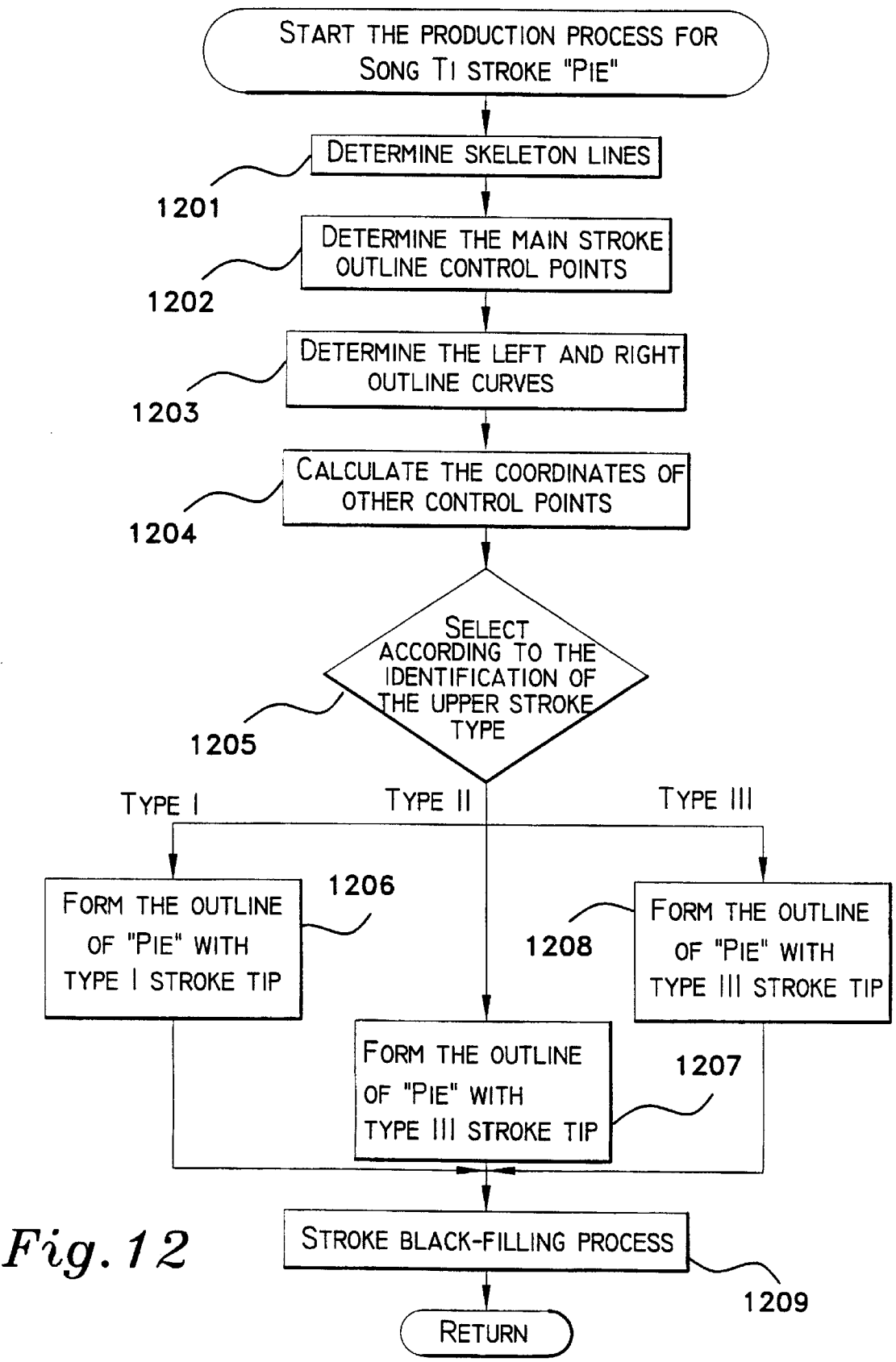

FIG. 12 is the diagram of the process to produce Song Ti stroke "Pie" (left falling stroke).

Figure 13A:
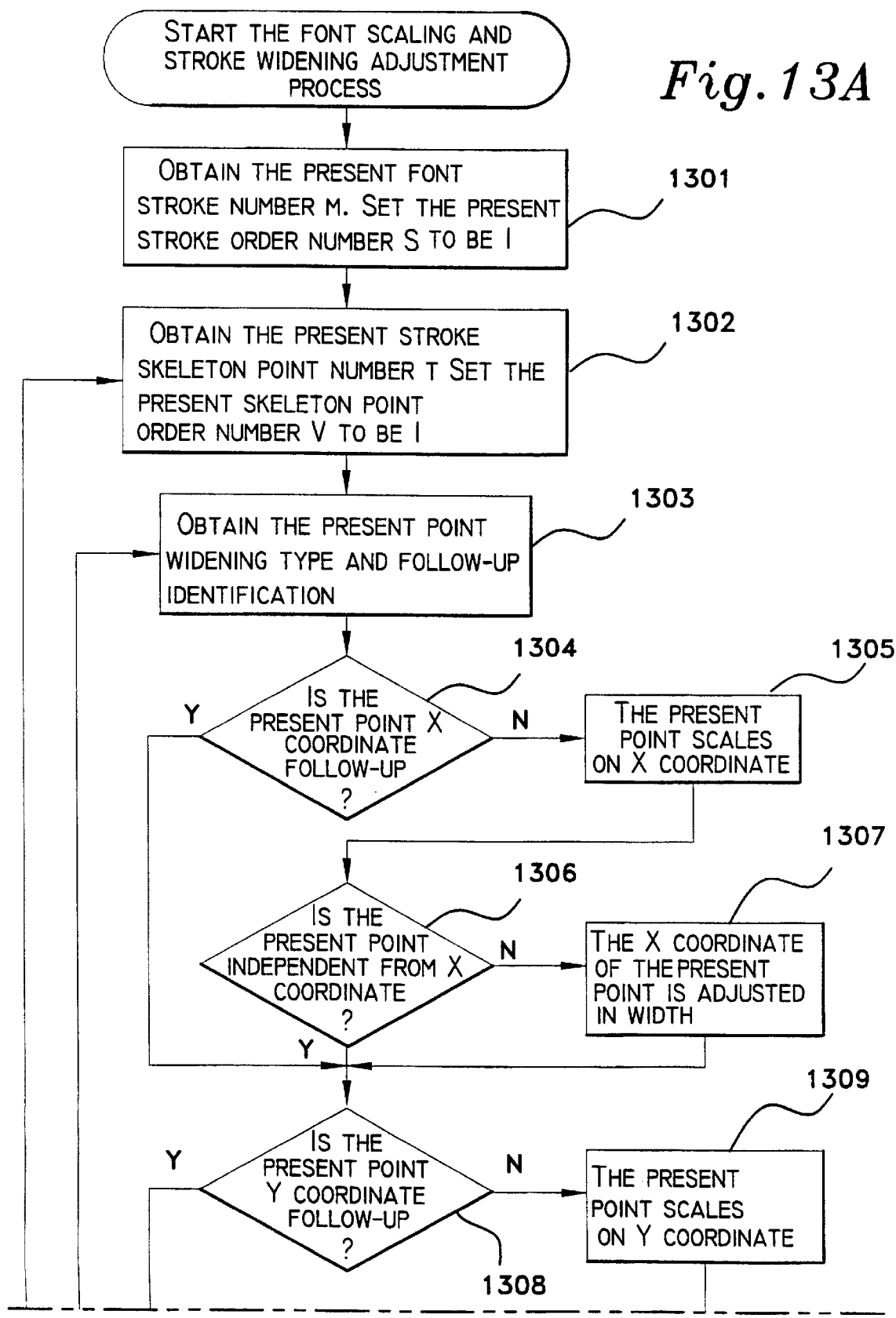
Figure 13B:
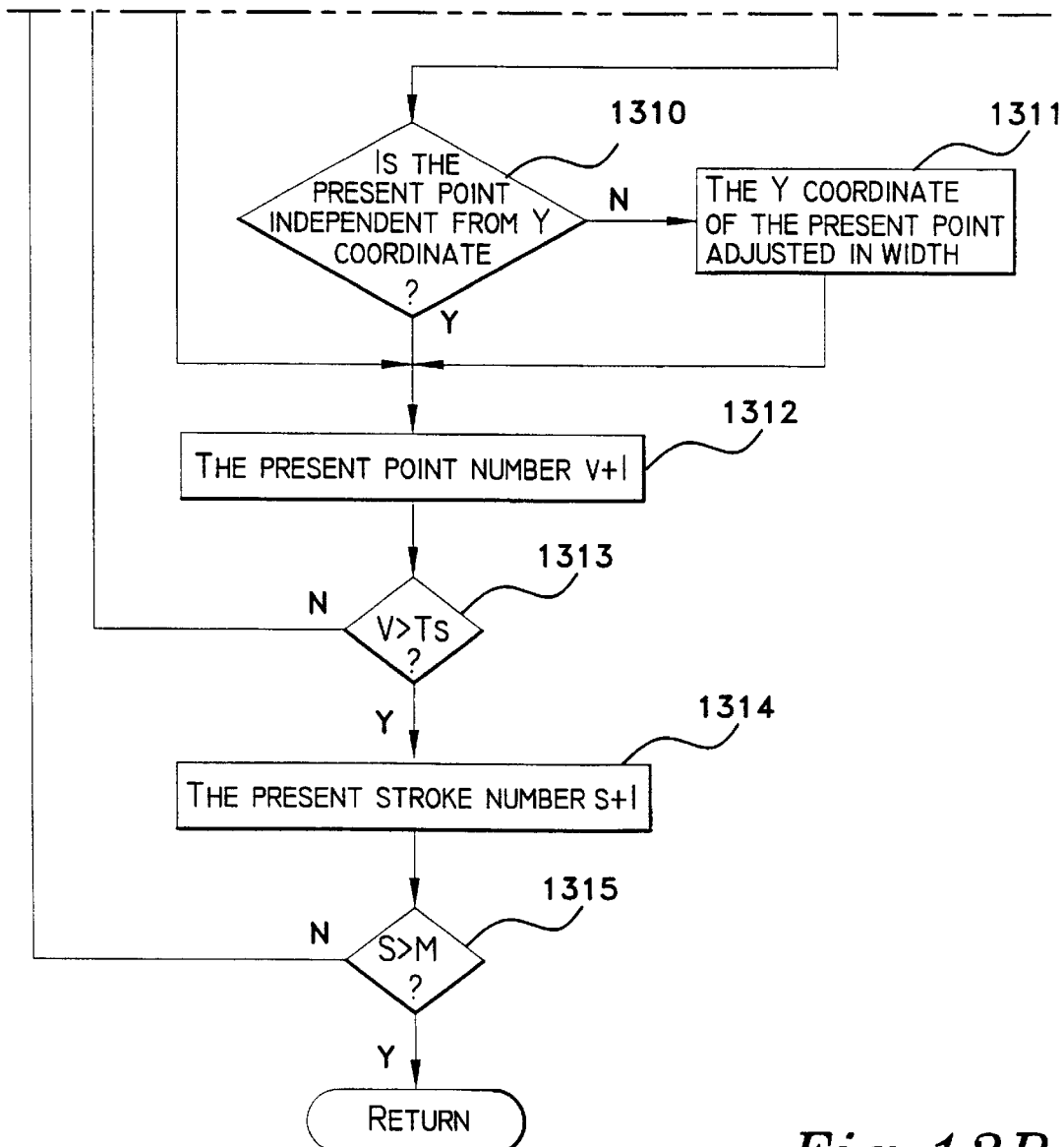

FIG. 13 is the diagram of the font scaling and stroke widening adjustment process.

Figure 14:
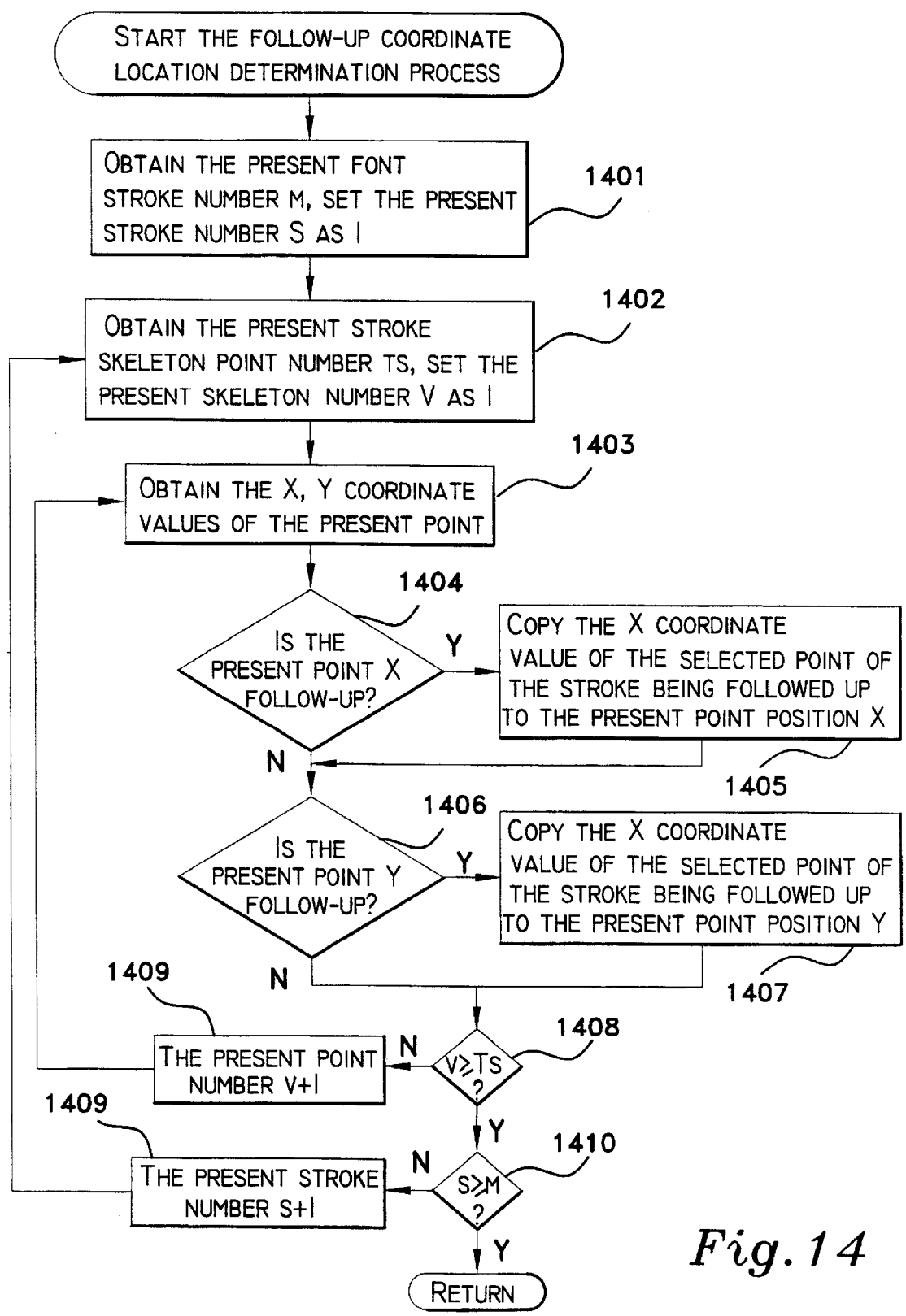

FIG. 14 is the diagram of follow-up point coordinate placement process.

Figure 15:
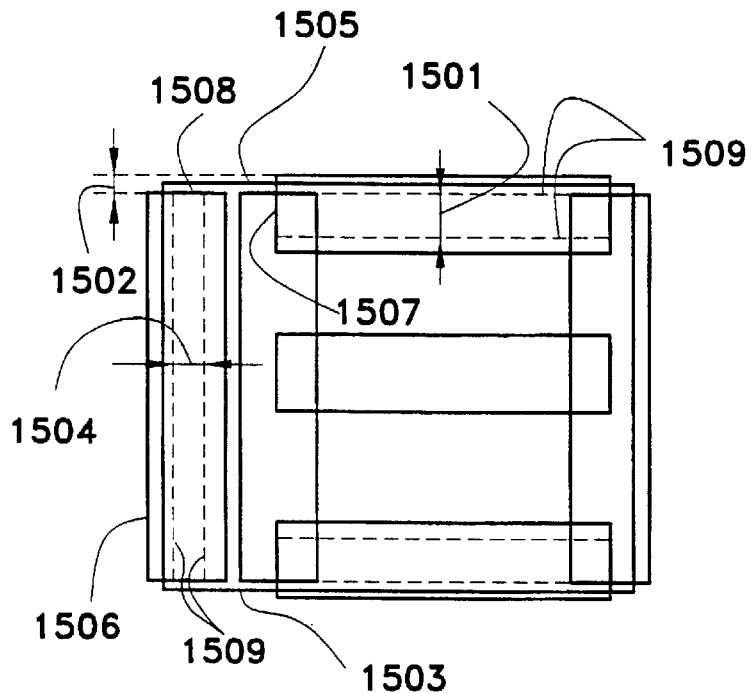

FIG. 15 shows the distortion caused by the existing stroke widening method.

Figure 16:
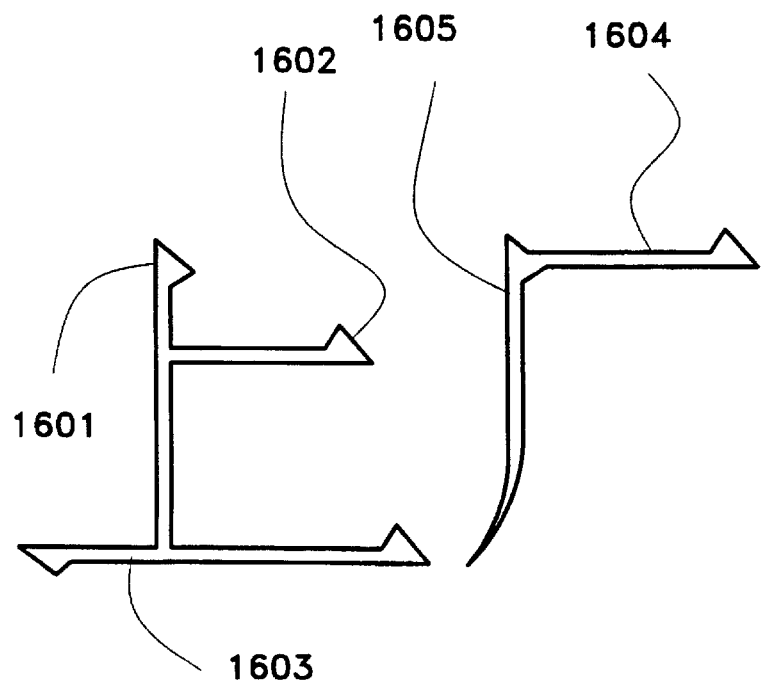

FIG. 16 is a diagram showing the follow-up characteristics of strokes.

Figure 17A:
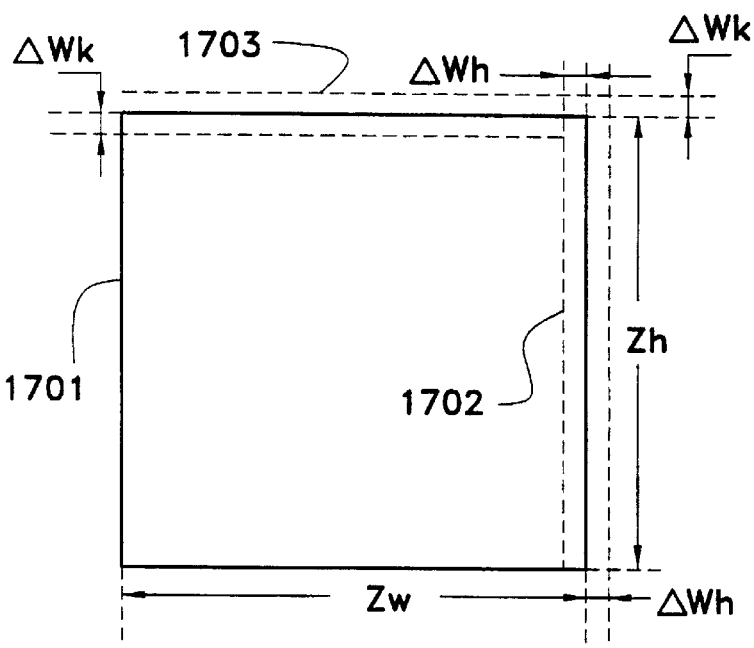

FIGS. 17a and b explain the stroke widening method.

FIG. 2 and FIG. 7 respectively show the information structure of one font and the stroke shape control information structure of one character style represented by the method of this invention. By representing the information of every font of one character style using the structure shown in FIG. 2, organizing them by the existing technology and then adding one stroke shape control information of this character style as those shown in FIG. 7, the font information base of this character style represented by the method of this invention will be then established. Furthermore, the structure shown in FIG. 7 can be added to each font variant of one certain primary character style, and in this way, the font information base of various variants which share the font information of the primary character style will then be established. The structure shown in FIG. 2 consists of font code area 201, font information length area 202, space occupation information area 203, concavity-convexity information area 204, stroke number area 205, and the stroke information areas of number m strokes 206, 207, up to 208. The structure of the information area of each stroke is the same as the information area 206 of the number one stroke. The information area 206 of the number one stroke includes the stroke type identification area 209, stroke tip type identification area 210 (composed of the stroke tip type of this stroke type 1 to $f_l$), skeleton point widening type area 211 (composed of the widening type of skeleton point 1 to $g_l$), skeleton point follow-up identification area 212 (composed of the follow-up identification of the skeleton point 1 to $g_l$ of this stroke) and nl number data area 213, 214 up to 215. The space occupation information area 203 can be either a single total space occupation factor or dimension, or the X or Y space occupation factors or dimension of the font. X and Y dimensions $l_x$ and $l_y$ are used in this example of actual application.

The skeleton point widening type area 211 records the widening type of every stroke tip. When the Y coordinate needs to be adjusted vertically according to the width changes of the horizontal stroke of the font, it is called a Y float. When the X coordinate needs to be adjusted horizontally according to the width changes of the vertical stroke of the font, it is called an X float. There are four skeleton point widening types: Independent (as 1601 upper end shown in FIG. 16), X float (as 1508 shown in FIG. 15), Y float (as 1603 left end shown in FIG. 16) and XY float (as point 1507 shown in FIG. 15). For the widening method, please see the explanation in FIG. 17.

The follow-up identification area 212 identifies the follow-up type of every skeleton point. Follow-up refers to the linked movement a certain skeleton point of one stroke makes with one skeleton point of another stroke. In FIG. 16, the upper end point of stroke 1601 does not move with other strokes, the left end X coordinate of stroke 1602 is consistent with the X coordinate of the upper end point 1601, the Y coordinate of stroke 1603 is consistent with the Y coordinate of the lower end of stroke 1601, and the X and Y coordinates of stroke 1605 are consistent corresponding with the X and Y coordinates of the left end of stroke 1604. The follow-up type can be four types corresponding with the four situations in FIG. 16: non follow-up, X follow-up, Y follow-up, and X and Y follow-up. When the follow-up type of one skeleton point is correspondingly the "X follow-up" or "XY follow-up" in the area 212, its actually recorded corresponding X coordinate location in the data area 213 to 215 is X follow-up information. When the corresponding follow-up type is "Y follow-up" or "XY follow-up", Y follow-up information is actually recorded at the Y coordinate location, and skeleton point coordinates will be recorded under other conditions. The follow-up information includes stroke numbers and skeleton numbers, indicating which skeleton point coordinate values of which stroke the said coordinate is consistent with. For instance, the stroke 1602 of the font "Shang" in FIG. 16 is recorded as "X follow-up" in the point 1 follow-up identification area of the skeleton point follow-up information area 212 in FIG. 2, but in the number 1 data area 213, the X coordinate value is no longer recorded and the follow-up information is recorded, in which the stroke number is absolute number 1 or relative number −1. The skeleton number 1 means the said X coordinate is the same as the X coordinate of the first skeleton point of the first stroke of this font. The concavity-convexity information area 204 records the periphery concavity-convexity of the font, which is explained in FIG. 6. The N7 to N7 in FIG. 6a has defined eight concave-convex directions of a font periphery, with the upper left corner as the starting point. Using the concavity-convexity in the four directions of upper, lower, left and right is also appropriate. If a font has no abutting stroke on the periphery at one certain direction, this character is then considered to be concave in this direction and when it is combined with other characters, the stroke of the other character is allowed to be inserted. If concave is labeled with 1 and the convex is labelled with 0, the periphery concavity-convexity of the character "Shang" can be expressed as "10100001" as shown in FIG. 6b. If the concavity-convexity of the left character is N0L to N7L and the concavity-convexity of the right character is N0R to N7R, the concavity-convexity of the character composed of these two characters through the combination of their left and right sides is as shown in FIG. 6c. In this case, the concavity-convexity of the upper section is the logical expression of the upper right concavity-convexity N2L of the left character and the upper left concavity-convexity N0R of the right character, while the concavity-convexity of lower section is the logical expression of the lower right concavity-convexity N4L of the left character and the lower left concavity-convexity N6R of the right character. The overall concavity-convexity of the font with an upper and lower structure can be obtained from the concavity-convexity information of the upper character and the lower character using a similar method.

Area 207 shows the example of the representation of composite stroke "Ri" in character "Hu", including stroke identification area 216, stroke tip identification area 217, skeleton point widening type area 218, follow-up identification area 219, every skeleton point data area 220, 221, 222 and 223 (equal to the upper left corner skeleton point coordinate X1 and Y1, and the lower right corner skeleton point coordinate X1 and Y1). The stroke tip identification area 217 records the lower left and lower right stroke tip identification of the said composite stroke as type II and type II respectively. The skeleton point widening type area 218 and the follow-up identification area 219 respectively record all the upper left and lower right skeleton points' widening type as "XY float" and the follow-up type as "no follow-up".

The stroke type identification area 210 and the stroke shape control information of FIG. 7 are explained using FIG. 4 as an example. FIGS. 4a, b, and c respectively represent the three types of upper stroke tip of Song Ti stroke "Shu" (vertical stroke), identified in order as type I, type II and type III. FIGS. 4d and e respectively show the two types of the lower stroke tip, identified in order as type I and type II. For each stroke, the stroke tip with several skeleton points is determined. For example, for each "Shu" (vertical stroke), there are two stroke tip identifications in the 210 area, and three upper tips and two lower tips can be combined into six types of Song Ti "Shu" strokes with different stroke tips. In the case of the first "Shu" (vertical stroke) of the character "Shang", its upper tip is type III and its lower tip is type I. In FIGS. 4a through e, there are the following stroke shape control parameters: Wh: widths of vertical strokes, Wl: left slanting widths of vertical upper tips, Hl: left slanting heights of vertical upper tips, Wr: outer reaches of right tips of vertical upper tips, Hu: right slant reaches of vertical upper tips, Hr: lower slanting heights of right tips of vertical upper tips, Hd: right slanting heights of vertical lower tips. It is obvious that the style of the strokes will be changed by changing these control parameters or adding other parameters; thus, yet a new variant can be further created. Users can design a new variant by adding a set of parameters. By changing some parameters and other related parameters through a parameter set-up command before the font restoration starts, the goal of a dynamic font modification can be reached without changing font data. These parameters can be obtained from the structure shown in FIG. 7 (the rest of the parameters in FIG. 7 will be explained below). The second column in FIG. 7 shows the functional relationships between each parameter and the widths of the horizontal (Wk) and vertical (Wh) strokes. Each parameter can be obtained from Wk and Wh according to the given functional relationships. In FIGS. 4a, c, d and e, points 401 and point 402 are the upper and lower skeleton points of the vertical stroke, points 403 to 412 are the outer/external characteristics points, among which, points 403, 404, 405 and 406 are the main/basic outline points of the stroke, which horizontally move towards the left and the right (Wh/2) from the skeleton points 401 or 402. Point 407 moves horizontally towards the left (Wl) from point 403, point 408 moves vertically downwards (Hu) from point 404, point 409 is located on the extended line of the ligature of points 407 and 408 and has a horizontal distance of Wr from the point 404. The point 410 is located directly below the point 408 and has a vertical distance of Hr from the point 409. The point 411 is located directly below the point 403 and the distance is Hl. The point 412 is located directly above the point 406 and the distance is Hd. The curve from the point 408 to 410 is a quadratic Bezier curve with points 403, 409 and 410 as its characteristic points. The curve from the point 405 to 412 is a quadratic Bezier curve with points 405, 406 and 412 as its characteristic points. The point 401' in FIG. 4b is obtained by moving vertically upwards (Hu+Wk/2) from the point 401. Its other parameters are the same as those in FIG. 4c but the reference points for the point 401 change into the reference points for the point 401'. This type of stroke tip is used at the upper ends of "Shu" (vertical strokes) which are to be matched together with the left ends of "Heng" (horizontal strokes), and it will make sure that the distortions of 1505 in FIG. 15 do not occur when the "Heng" is widened. It is also possible to design some parameters in FIG. 7 into functions of the present font heights and widths (for the parameters which are expected to not change with changes of the stroke widths). Because the stroke width information and the stroke tip shape information are separated out from the font information, the font information volume is reduced, and it has thus made the font design easier and also made it possible for all the variants of one primary character style to share a common set of font information, which increased the variant consolidation compression ratio greatly while simultaneously maintaining high accuracy.

FIG. 3 is an example of the composite stroke "Ri". A composite stroke is a group of strokes which is composed of two or more other strokes and has certain relations within all the strokes. For example, this specific "Ri" is consisted of stroke "Zuo Shu" (left vertical stroke), "Heng Zhe Shu", "Zhong Heng" (center horizontal stroke) and "Xia.Heng" (bottom horizontal stroke), and the "Heng Zhe Shu" stroke is further consisted of a horizontal stroke and a vertical stroke and the distances between the center horizontal stroke and the bottom and the upper vertical strokes are same. The stroke shape control parameter includes the length (Hh), which extends downwards correspondingly to the type II stroke tip of "Ri" stroke, and the widths of the present vertical and the horizontal strokes (Wk and Wh) (Shown in FIG. 7). The dotted lines at the left and right lower parts are respectively the outlines of the left lower stroke tip of type II and the right lower stroke tip of type II. And the solid lines above the dotted lines are the outlines of the corresponding lower left stroke tip of type I and the lower right stroke tip of Type I. The dotted line at the right upper corner is the outline of "Heng Shu Zhe" stroke when its right upper stroke tip is type I, and the solid line is the outline of its type II stroke tip. P1 an P2 are the skeleton points of stroke "Ri" at the left upper corner and right lower corner. P3 and P4 or P'4 (corresponding to the situations when the left lower stroke tip is type I and II respectively) are respectively the upper and lower skeleton points of the stroke "Zuo Shu". P1 and P5 or P'5 (correspondent with the situations when the left lower stroke tip is type I and II respectively) the left upper and the right lower skeleton points of the stroke "Heng Zhe Shu". P6 and P7, and P8 and P2, are the left and right skeleton points of the center and bottom horizontal strokes, respectively. In FIG. 2 and FIG. 7, the stroke number of the composite stroke "Ri" is 2 and the skeleton point number is also 2. The coordinate value of the skeleton points of each sub-stroke of this stroke "Ri" can be calculated according to the following equation:

$$Y6=Y7=Y2+(Y1-Y2+1)/2 \quad Y2=Y8=2*Y6-Y1$$

(obtained from the condition of equal-distance of three "Heng" strokes $Y6-Y8=Y1-Y6$)

$$X3=X'4=X4=X6=X8=X1$$

$$Y3=Y1+Wh/2+Hu$$

$$Y4=Y5=X2-Wh/2=Hh$$

$$Y'4=Y'5=Y4=Hh$$

$$X5=X'5=X7=X2.$$

The use of the composite stroke can reduce stroke redundancy. With this composite stroke, the distortion such as 1505 shown in FIG. 15 can also be eliminated and the equidistance of the isometric type composite stroke can be maintained.

The following is an explanation of the production process of a font information table composed of many structures shown in FIG. 2. First of all, the basic stroke type is determined and then the composite strokes composed of other strokes are determined and labelled as stroke identification by order. Usually, the stroke compositions with frequent appearance, more coordinate repeating information or the isometric type strokes are determined as composite strokes. Each stroke has the same skeleton point number and same stroke tip number. The stroke tip type of each tip point and turning point with different shapes of each stroke are determined and labelled separately as identifications. Then each font is processed according to the font code order. The font code, the concavity-convexity information and the stroke number of each font are placed in areas 201, 204 and 205. For the first stroke of a font, its stroke number, number of each stroke tip, every skeleton point's widening type and follow-up identification information are successively placed in areas 209, 210, 211 and 212, and the coordinate data or follow-up information are placed successively in areas 213, 214 and up to 215 according to the follow-up identification. The rest of the strokes are processed in the same way as with the first stroke. At last, the X and Y dimensions of this font, and the information area length of this font are calculated and placed in areas 203 and 202 respectively. Connecting the font information of each font successively, the font information table of the present invention is then formed.

Figure 1A:
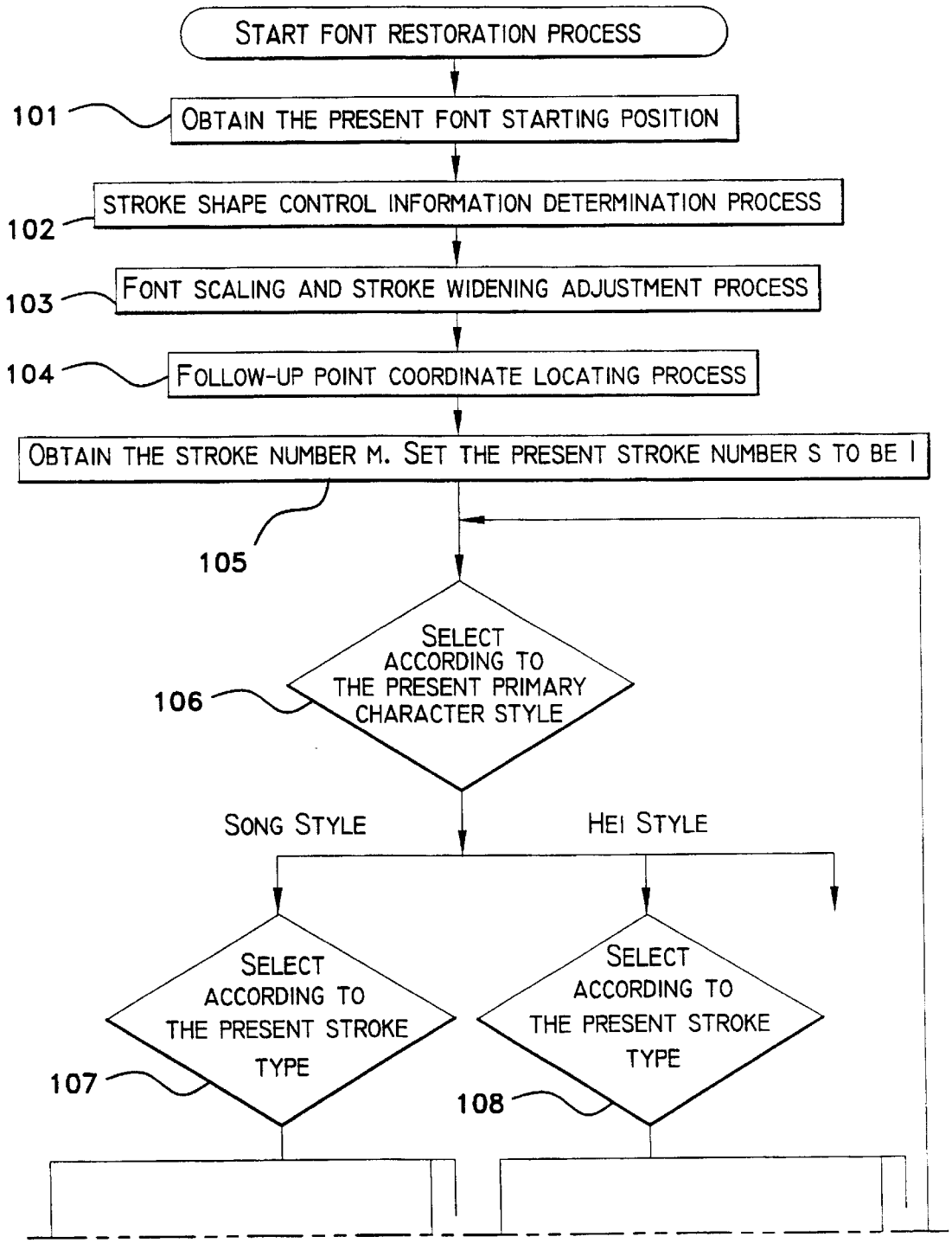
FIG. 1 is the font restoration processing diagram based on the said method of this invention.
Figure 1B:
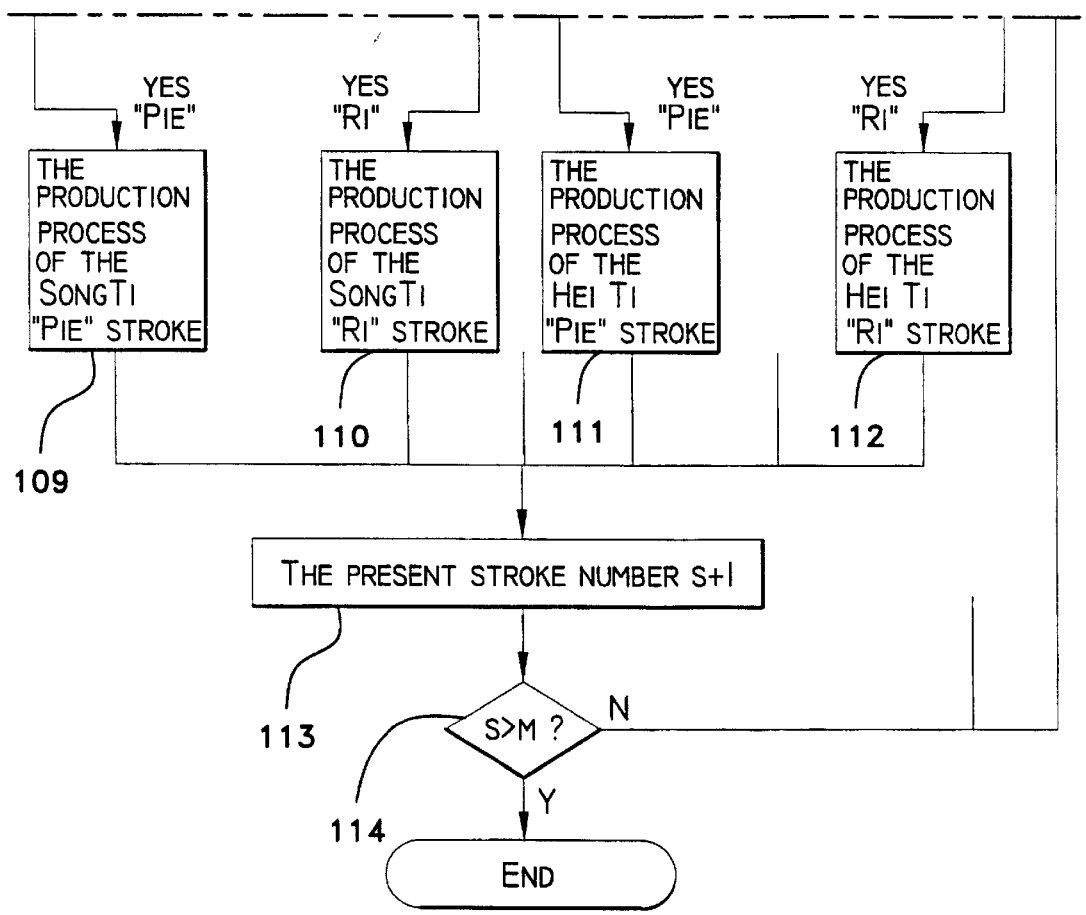

The following is to explain the font production process diagram shown in FIG. 1, using FIG. 9, FIG. 11, FIG. 12, FIG. 13 and FIG. 14. The entrance parameters of this process include the font code, character style and X and Y scaling proportions Kx and Ky. In FIG. 1, step 101 is to obtain the font starting position from the font information table based on the font code. Step 102 is to execute the determination process of the stroke shape control information shown in FIG. 11. Step 103 is to execute the font scaling and the stroke widening adjustment process shown in FIG. 13. Step 104 is to execute the locating process of the follow-up point coordinates shown in FIG. 14. Step 105 is to obtain the present font stroke number m and set the present stroke number s to 1. Step 106 is to select and execute one corresponding process from 107, 108 and so forth based on the primary character style to which the present character style belongs. Step 107 is to select and execute one process from 109, 110 and all the following Song style strokes' production processes based on the present stroke type identification. Step 109 is to execute the production process for Song style stroke "Pie" shown in FIG. 12. Step 110 is to execute the production process for Song style composite stroke "Ri" shown in FIG. 9, etc. Step 108 is to select and execute one process from 111, 112 and all the following Hei style strokes' production processes based on the present stroke type identification. Steps 111 and 112 are, respectively, the production processes of the Hei style stroke "Pie" and the composite stroke "Ri", etc. Step 113 is to add 1 to the present stroke number s. Step 114 is to determine if s>m. If the condition is untenable, it will execute step 106, or else it is the end of the process.

The determination process of the stroke shape control information shown in FIG. 11 is used in step 102 shown in FIG. 1. Step 1100 is to select the stroke shape control information of a variant of the primary character style as the present control information according to the present character style. Step 1101 is to search the table in FIG. 5 using the present X and Y scaling proportion Kx and Ky respectively, and to obtain the width scaling proportion KWh and KWk of the vertical and horizontal strokes under the present scaling proportion. Step 1102 is to calculate KWk*Wk and KWh*Wh, and obtain the reference stroke widths Wk1 and Wh1 of the horizontal and vertical strokes under the present scaling proportion. Step 1103 is to obtain the dimensions lx and ly of the present font from 203 in FIG. 2, then multiply them respectively by Wk and Wh and further obtain the X and Y space occupation coefficients WX and WY of the font. And then, the left and right sections of the table in FIG. 5c are searched using WX and WY to obtain the stroke width adjustment coefficients CX and CY of the horizontal and vertical strokes. Step 1104 is to calculate CX*Wk1 and CY*Wh1 to obtain the actual horizontal and vertical stroke widths W'k and W'h, respectively, of the present font. Step 1105 is to calculate other coefficients using W'k, W'h and the functional relations recorded in FIG. 7, and then form the shape control coefficient structure of the present font shown in FIG. 2 to be used in the present font restoration steps 103 to 114 in FIG. 1, and at last return. As an alternative plan, it may also use lx and ly directly in step 1103 to search the left and right sections, respectively, shown in FIG. 5b to obtain CX and CY. Another plan is to use the following method in step 1102 and 1104: Use lx and ly to search the left and right sections shown in FIG. 5b respectively, obtain the adjusted reference horizontal and vertical stroke widths from the 3rd and 6th columns, and multiply them respectively by KWh and KWk, and then similarly, W'k and W'h are obtained. Steps 1104 and 1105 ensure that the stroke width and each coefficient value are equal or greater than 1 and the stroke tip will not get lost even without using hint information. Here, take the font " " (The Area code is 5613, lx=0, ly=225) as an example to explain this process. Set the present character style to be Song style, Kx=Ky=0.5. In step 1101, use 0.5 to search FIG. 5a and obtain KWh=KWk=0.5*0.8=0.4. Wk1=7*0.4, Wh1= 13*0.4 are obtained in step 1102. Step 1103 is to use lx and ly to search FIG. 5b and obtain CX=1.3 and CY=1.15. W'k=3*1.3 and W'h=5*1.15 are obtained in step 1104. Step 1105 calculates each stroke shape control coefficient of the present font using W'k=4 and W'h=6. The effects obtained are: 1. The stroke narrowing proportion is smaller than the font reduction proportion (or the opposite when the font is enlarged), 2. Increase in the width of vertical strokes' Wh or horizontal strokes' Wk of the characters with fewer vertical or horizontal strokes (or the opposite with the characters with more horizontal or vertical strokes), and at the same time, other stroke shape control coefficients are also adjusted correspondingly. Therefore, although there is no width information in each stroke, the proper font stroke width is guaranteed. Increasing the number of lines in FIGS. 5a, b and c can make the control even finer. An independent set of tables as shown in FIGS. 5a, b and c can also be set up for each primary character style.

Figure 17B:
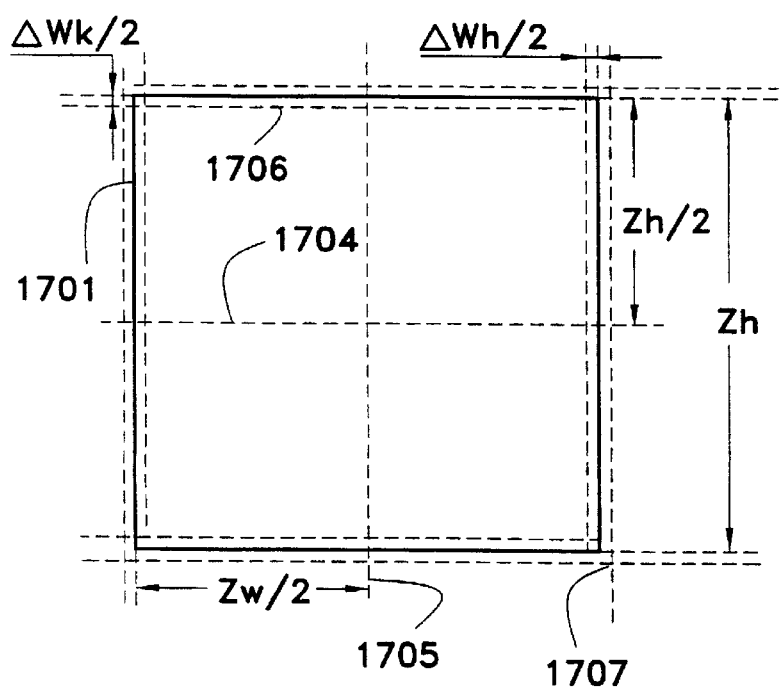

Here, the widening adjustment method of the stroke tip point will be explained using FIG. 17. In FIG. 17, 1701 is the side frame line of the reference font, 1702 is obtained from reduction in 1701 when the width of both horizontal and vertical strokes increase compared with the reference font, 1703 is obtained from enlargement of 1701 when the width of both horizontal and vertical strokes diminish compared with the reference font. It can also be that the horizontal stroke becomes wider and the vertical stroke becomes narrower, or the opposite. 1704 and 1705 are the centerline of the reference font. 1706 and 1707 are obtained by moving 1702 and 1703 respectively in the horizontal direction. Zh and Zw are the height and width of the reference font, respectively. ΔWk=W'k−Wk and ΔWh=W'h−Wh are the differences in widths of horizontal and vertical strokes before and after (W'k and W'h) being widened. Given that X'i and Y'i are the new coordinates of Xi and Yi after the widening adjustment is done, the widening method is as in the following equations:

$$X'i = Xi * nx + \Delta Wh/2 \quad \text{(Eqation 1)}$$

$$Y'i = Yi * ny + \Delta Wk/2 \quad \text{(Eqation 2)}$$

In the equations: ΔWh, ΔWk, Zw and Zh: are as described before. nx=1−ΔWh/Zw. ny=1−ΔWk/Zh.

Equation 1 and Equation 2 are used in steps 1307 and 1311 respectively in FIG. 13. The meaning of equation 1 is: When the strokes in the font are widened, widening is done with an increase in amount (ΔWh/2) of half a vertical stroke width at both left and right sides from its skeleton point which is taken as the center, which may cause the vertical stroke located at the edge of the font to cross out of the frame line, as with 1506 shown in FIG. 15. Therefore, the X coordinate of the skeleton points of the "Shu" strokes on the left and right edges must be moved towards the font centerline 1705 in the amount of ΔWh/2. In order to keep the distance between strokes even, the closer a X coordinate is to the centerline, the less of a distance it should be moved. In equation 1, the above related effect is actually being reached by reducing the font in width with the amount of ΔWh and then moving it in the horizontal direction with the amount of ΔWh/2 (only change the X coordinate of the points in the skeleton point widening type identification area 211 in FIG. 2, which are identified as necessary to be widened in the X or XY direction). The case of vertical strokes being narrowed is just the opposite. The method for stroke widening adjustment in the vertical direction using the equation 2 is similar to this. The effect reached by this method is that when the stroke width is changed within the same side frame line, no distortion like 1505 will occur to the font and at the same time the font structure is kept even, which has overcome a shortcoming of the Chinese patent (3). Meanwhile, because the Y coordinate of the skeleton point of the left "Shu" in FIG. 15 is identified as "independent" in the widening type identification area 211 and will not change, but the upper end of the "Ri" on the right side is adjusted downwards, distortion such as that of 1502 in FIG. 15 can be avoided. The font scaling and stroke widening adjustment process is used in step 103 in FIG. 1. Step 1301 is to obtain the stroke number m and set the present stroke number v as 1. Step 1302 is to obtain the present stroke skeleton point number ts from the stroke shape control information and set the present stroke skeleton point number v as 1. Step 1303 is to obtain the widening type of the present skeleton point and the follow-up identification from 211 and 212, respectively, in FIG. 2. Step 1304 is to determine if the present X coordinate is follow-up. If it is follow-up, step 1308 is executed, or else step 1305 is executed. Step 1305 is to scale the present X coordinate according to the present font X scaling proportion Kx. Step 1306 is to determine if the present point's X coordinate is independent. If it is independent, step 1307 is skipped. Step 1307 is to carry out widening adjustment to the X coordinate of the present point according to the equation 1. Step 1308 is to determine if the present Y coordinate is follow-up. If it is follow-up, step 1312 is executed, or else step 1309 is executed. Step 1309 is to scale the present Y coordinate according to the present font Y scaling proportion Ky. Step 1310 is to determine if the present point's Y coordinate is independent. If it is independent, step 1311 is skipped. Step 1311 is to carry out widening adjustment to the Y coordinate of the present point according to the equation 2. Step 1312 is to add 1 to the present skeleton point number v. Step 1313 is to determine if v is greater than ts. If the condition is untenable, step 1303 and the following steps are executed, or else step 1314 is executed. Step 1314 is to add 1 to the present stroke number s. Step 1315 is to determine if s is greater than m. If the condition is untenable, step 1302 and the following steps are executed again, or else the process is ended and returns to start.

The follow-up point coordinate locating process shown in FIG. 14 is used at 104 in FIG. 1. Steps 1401 and 1402 are the same as steps 1301 and 1302 in FIG. 13, respectively. Step 1403 is to obtain the X, Y coordinate value of the present point. Step 1404 is to determine if the X coordinate of the present point is follow-up. If it is not follow-up, step 1405 is skipped (At this point, the X coordinate value obtained by step 1403 is actually the follow-up information). Step 1405 is to obtain the order number of the stroke which is followed up and the order number of the point which is followed up from the X follow-up information of the point, obtain the X coordinate value of this point and give the X coordinate position of the present point. Step 1406 is to determine if the Y coordinate of the present point is follow-up. If it is not follow-up, step 1407 is skipped. Step 1407 is to obtain the order number of the stroke which is followed up and the order number of the point which is followed up from the Y follow-up information obtained by step 1403, obtain the Y coordinate value of this point and give the Y coordinate position of the present point. Step 1408 is to determine if v equals or is greater than ts. If the condition is tenable, step 1410 is executed, or else the process will continue from step 1403 after step 1409 is executed. Step 1409 is to add 1 to the present skeleton point number v. Step 1410 is to determine if s is equal to or greater than m. If the condition is tenable, the process returns, otherwise it continues from step 1402 after step 1411 is executed. Step 1411 is to add a to the present stroke number s. Using the follow-up information can reduce the stroke fine adjustment information. For example, in character "Ka", if 1601 in FIG. 16 needs to be moved towards the left, 1602 must be also moved towards the left, thus two sets of stroke fine adjustment information are necessary. The method of the present invention has made X of the left end of 1602 to follow-up with the X of the 1601 upper end, therefore, only one set of fine adjustment information is needed, thus has overcome a shortcoming of the Chinese patent (1).

The production process of the Song style stroke "Pie" in FIG. 12 is used in step 109 in FIG. 1. The produced stroke is as shown in FIG. 8. The entrance coefficient of this process includes stroke tip type identification, skeleton point coordinates and the present font stroke shape control information. The stroke "pie" shown in FIG. 8 has three skeleton points 801, 802 and 803. At the upper end there are three stroke tip types of types I, II and III. The points 805, 806, 807, 808, 809, 810 and 803 are the basic shape control points of this stroke. Therefore, when the stroke "pie" is represented using the area 210 in FIG. 2, the stroke identification number f1 is 1, and the skeleton point number g1 is 3. The shape control coefficient of the stroke "pie" includes the upper end width Wx, the middle point width Wz, the lower pointing tip radius WR, the right upper tip outer point distance Wt and the right upper tip height Wy. Together with the stroke identification number and the skeleton point number, they are all given in the stroke shape control information shown in FIG. 7. The skeleton line passing through the skeleton points 801, 802 and 803 is a quadratic Bezier curve. The points 805 and 806 are on the normal of the skeleton line which passes through the point 801, and both points have a distance from the point 801 of Wx/2. The points 807 and 808 are on the normal of the skeleton line which passes through the point 802, and both points have a distance from the point 802 of Wz/2. The point 804 is on the skeleton line and has a distance from the point 803 of WR. The points 809 and 810 are on the normal of the skeleton line which passes through the point 804, and both points have a distance from the point 804 of WR. The left outline which passes through the points 805, 807 and 809, and the right outline which passes through 806, 808 and 810 are the quadratic Bezier curves passing through the above related two sets of points, respectively. The curve which passes through the points 810, 803 and 809 is a half circular arc passing through these three points. The point 811 is on the extension of the line passing through the points 805 and 806, and has a distance from the point 806 of Wt. The point 812 is on the right outline and its distance from 806 is Wy. The horizontal straight line between the points 813 and 814 passes through the point 801, and these points are located on the points of intersection of this straight line and the left and right outlines, respectively. In FIG. 12, step 1201 is to determine the skeleton line passing through the skeleton points 801, 802 and 803. Step 1202 is first to determine the point 804, and then determine the basic control points 805 up to 810. Step 1203 is to determine the curves that pass through the points 805, 807, 809 and points 806, 808 and 810. In steps 1201 and 1203, the unknown coefficient t of the Bezier curve at the center point is given as 0.5 and thus the coefficient of the parametric equation is obtained. If the stroke "Pie" of the cubic Bezier curve is used (or set up specially), the coefficients t of two points in the center can be taken as 1/3 and 2/3. Step 1204 is to calculate other stroke shape control points according to the description in FIG. 8. Step 1205 is to select according to the upper stroke tip type and execute steps 1206, 1207 and 1208 respectively for the stroke tips of type I, II and III. Steps 1206, 1207 and 1208 produce the outline curves of the stroke "Pie" of three types. Step 1209 is a known blackening process which fills the area within the closed outline produced by the last step, and then returns.

The production process of the Song style stroke "Ri" in FIG. 9 is used in step 110 in FIG. 1 and its entrance coefficient is similar to those of the stroke "Pie". Step 901 is to calculate the coordinate of each point according to the description in FIG. 3. Step 902 is to determine if X2−X1<2 (If the left and right vertical strokes merge together when the vertical width is 1). If the condition is untenable, step 903 is skipped. Step 903 is to set X2 as X1+2. Step 904 is to determine if Y1−Y2<4 (If three horizontal strokes merge together when the horizontal width is 1). If the condition is untenable, step 905 is skipped. Step 905 is to set Y2 as Y1−4. Step 906 is to determine if three horizontal strokes merge together, namely to determine if Y1−Y2<2*Wk+2. If there is no merging together, step 907 is skipped. Step 907 is to set the horizontal width W'k of the present composite stroke "Ri" as (Y1−Y2−2)/2. Step 908 is to determine if the left and right vertical strokes merge together, namely to determine if X2−X1<Wh+1. If not, step 909 is skipped. Step 909 is to set the vertical width W'h of the present composite stroke "Ri" as X2−Xi−1. Step 907 and 909 are to recalculate each shape control coefficient and produce the stroke shape control coefficient of the present stroke according to FIG. 7. Step 910 is to set the upper stroke tip type as type II and the lower stroke tip type as type II. Step 911 is to determine the left lower stroke tip type, and execute step 912 with type I stroke tip and step 913 with type II stroke tip. Step 912 or 913 is to execute the production process of the stroke "Shu" using the upper and lower skeleton points P1, P4 or P1, P'4 and the stroke tip type set by step 910. Step 914 is to set the left, left upper and the lower stroke tip type of the stroke "Heng Zhe Shu" as type I, type II and type II respectively. (In FIG. 9, suppose the rectangular left and right tips of the vertical stroke are both type I, the left tip type of the stroke "Heng Zhe Shu" is the same as the left tip of the horizontal stroke, and the lower tip type is the same as the lower tip of the vertical stroke) Step 915 is to determine the right lower tip type of the stroke "Ri", and execute steps 916 and 917 with the type I and type II strokes respectively. Step 916 or 917 is to execute the production process of the stroke "Heng Zhe Shu" using the left upper and right lower skeleton points P1 and P5 or P1 and P'5 and the stroke tip type set by step 915. Step 918 and 919 are to set both left and right stroke tip of the center horizontal stroke and the lower horizontal stroke as type I and execute the production process of the vertical strokes using the left and right skeleton points P6, P7 or P8, P2 and the pre-set stroke tip type. At last, the process returns. In each step of step 912, 913, 916, 917, 918 and 919, the production process of sub-strokes are executed using the stroke shape control coefficient of the present stroke. Here the distortion shown by 1505 in FIG. 15 can be eliminated by using the composite strokes. In addition, equal-distance type composite strokes can be prevented from becoming unevenly distanced or merging together when using the small font sizes.

The following is an explanation of the method of obtaining the stroke shape control information of a specific character style shown in FIG. 7 and the method of constructing the production process of each stroke of this character style. For each type of stroke of the selected font which is to be represented, choose a typical shape of this font, determine its skeleton points and the stroke basic control points, determine the shape control coefficients which are required for obtaining each basic control point from the skeleton points and their relationship with the widths of horizontal and vertical strokes, then determine the control points of each stroke tip of each end point and turning point, determine the shape control coefficients required for obtaining each stroke from the skeleton points or the basic control points and their relationship with the widths of horizontal and vertical strokes, determine the end points which might have stroke tips, turning point number and the skeleton point number. By organizing all these stroke shape control coefficients and relationships in the method shown in FIG. 7, the stroke shape control information of this character style is then formed. The stroke shape control information volume of different character styles may be different. The production process of each basic stroke can be determined by the following method: The entrance coefficient includes the position of each skeleton point of this stroke and the stroke tip type of each end point and turning point. First is the determination step of each skeleton point and turning point (including step of selecting corresponding process step for this stroke tip type, and the determination step of each control point of each stroke tip type). Then comes step of connecting corresponding stroke tip control points or the stroke basic control points according to each stroke tip type. The last is step of executing a filling process and step of returning. For each composite stroke, the entrance coefficients are the same as those of the basic strokes and the its production process is as follows: First, calculate the coordinate of each skeleton point, then determine the skeleton point and the stroke tip of each component stroke according to the skeleton and the stroke tip, and at last, using the skeleton point and the stroke tip information of each component stroke as coefficients, call the production process of each component stroke. For the equal-distance type of composite stroke, steps of equal-distance adjustment and the stroke width adjustment, which is to avoid the stroke merging together, are added. According to the above explanation and the explanations in FIG. 8 and FIG. 4, and following the example of the production process of Song style stroke "Pie" in FIG. 12, the general technical people in the field can easily accomplish the production process of Song style stroke "Shu" shown in FIG. 4, can further determine the shape control information of each stroke of various variants and different character styles, and accomplish their production processes.

According to the above related stroke restoration method, the shape of each stroke is controlled by its specific restoration process based on the shape control information. Different primary character styles have different restoration processes and the different variants of the same primary character style have different shape control information. This type of design has transferred the complicated stroke shape control to the specific stroke restoration process, thus simplified the font information and attained the effect of easy design and flexible control. By changing the position of the skeleton points, the stroke identification and the relevant control information, many different styles of one stroke can be produced through one production process of this stroke. In addition, during the restoration of large sized fonts, the stroke shape can be precisely controlled by the stroke restoration process and the connections can be made smooth without increasing the stroke information volume. This has thus reached the effect of maintaining the stroke tip quality during the restoration of large sized fonts without increasing the resolution of the reference font. When restoring the small sized fonts, the distortion such as the loss of stroke tip can be avoided without using hint information. The present invention can increase the variant consolidation and the scaling overlay compression ratio by a great amount.

Using FIG. 10, the next is an explanation of the method for applying the present invention in the font base representation and restoration. For other font representations and restorations, the actual applied method described in the Chinese patent CN1076036A (hereafter called "this/the said patent") is used. FIG. 1 and the following related representation method, and FIG. 6 and the following related restoration method in the said patent are taken as examples. Each font base in the font information area 107 of the font base described in the said patent has used the structure shown in FIG. 2 of the present invention. For many different kinds of character styles which share standard font information, the various variants of each primary character style share a font base area which uses the method of the present invention, and each variant has a separate stroke shape control information area. The font production process 602 of the said patent is replaced with the font production process in FIG. 1 of the present invention. In front of the transformation step 907 (parameter fine adjustment) of the left and right structure type of font described in FIG. 9*a* of the said patent, the concavity-convexity adjustment process for the left and right structure types of font shown in FIG. 10*a* of the present invention is added. In front of the transformation step 916 (parameter fine adjustment) of the upper and lower structure type of font described in FIG. 9*b* of the said patent, the concavity-convexity adjustment process for the left and right structure type of font shown in FIG. 10*b* of the present invention is added. The concavity-convexity of the font base is also obtained from step 1002 shown in FIG. 11 of the said patent. At the end of each FIG. from FIG. 7 to FIG. 11 of the said patent, other than returning to the overall dimension, it also returns to the concavity-convexity of the present font. In steps 902 and 904 of FIG. 9*a* and steps 911 and 913 of FIG. 9*b* of the said patent (obtaining the present font dimension), the concavity-convexity of two sub-fonts has been obtained from step 1105 in FIG. 11 (returning to the font dimension and concavity-convexity) and is available for use in the next steps. In FIG. 10*a* of the present invention, step 1001 is to obtain the concavity-convexity information of the left and right font respectively. Step 1002 is to determine if the opposed implantation is possible. If it is not possible, step 1003 is executed. If it is possible, step 1005 is then executed. Step 1003 is to determine if the implantation can be done in one direction of left or right. If yes, it will turn to step 1006, or else step 1004 is executed. Step 1004 is to reduce the two sub-fonts by a certain proportion and move the right font towards the right. Step 1005 is to enlarge the two sub-fonts by a certain proportion, move the right font towards the left and make the two fonts implanted with each other. Step 1006 is to adjust the left and right fonts according to the width difference of the vertical strokes. Step 1007 is to obtain the overall concavity-convexity according to the method shown in FIG. 6. Step 1008 is to return to the overall concavity-convexity. Steps 1004 and 1006 respectively keep an extra space of ΔWh and ΔWh/2 between the left and right sub-fonts. When given that the ΔWh is 0, it is the concavity-convexity adjustment process of the left and right fonts without considering the influence from the strokes' widening. In this case, step 1006 can be skipped. According to the above presentation, general technical people in the field can easily carry out the concavity-convexity adjustment process shown in FIG. 10 *b* for the fonts of upper and lower structure types. This method has rectified the shortcomings in the standard font combining process of the Chinese patent (1).

The font information which are generated by the font information demonstration method stated in the present invention can be saved in an information storage device. The restoration method stated above can be realized by an information processing program. This program can also be saved in an information storage device and can be run in this device to make products including the invention method. The said information processing device usually has the capabilities of information storage, processing, input, and output, such as a computer.

The present invention can be used independently, or used in combination with the previously related Chinese patent (1) as well. It can be either used for the Chinese fonts or the European fonts. It can also be used as an auxiliary tool for font design. The combined use of the present invention with the Chinese patent (1) can make full use of the advantages of the Chinese patent (1), such as high compression ratio, high independence of the standard font information and the low design work load of the standard font combination, and the advantages of the present invention, such as high font representation accuracy, high variant consolidation and compression ratio, great stroke widening range and the high scaling overlay compression ratio, and is one of the best practical application plans. Because all the standard combination fonts share one set of font information, for a large font set with 60,000 characters and resolution of 256×256, the total storage volume of one set of a primary character style (including its different kinds of variants) is approximately 300 KB, with an approximate increase of 150 KB per additional primary character style. Therefore, the total volume of ten sets of primary character styles (may include up to 50–100 sets of variants, namely 50–100 sets of fonts as generally called) does not exceed 2000 KB, which is equivalent to the volume of a 20,000character font set of the same accuracy. Its overall compression ratio is far higher than any of the present technology and the restoration accuracy is maintained high at the same time. Because the standard font takes more than 98% of the 60,000 characters, the font design work load is very low. When using the conventional technology, four sets of commonly used fonts with about 1500 characters in each font are usually called into the internal memory to be resident and the hit rate of the internal memory visiting reaches 95%. When the rest of the fonts are needed, they will be called in from the hard disc. Calculated by taking the average waiting time of calling from the hard disc each time as 5 ms, the average total waiting time for restoring 100 characters is approximately 50 ms. If a change of character styles is required, the time it takes will increase by a great amount. Therefore, the restoration speed of this technology relies very much on the performance of the hard disc; however, the increases in the average calling speed of the hard disc are very slow. Because the variant consolidation and compression ratio of this actual application example is high, several tens of sets of fonts under the conventional concept can be called into the equivalent amount of internal memory and there is no need to visit the hard disc during the font restoration. This helps to make use of the speed of the CPU, of which the performance/price ratio is increasing very rapidly. Therefore, using the present invention in font restoration can also attain the effect of not being slower than the present technology.

What is claimed is:

1. A representation method of font information for decomposing the font information into strokes and representing them separately, comprising the steps of:
   determining font information of each character having identification information, skeleton line locating point information, and end and turning point stroke tip type information for each stroke;
   determining the font information of each character style having single set of stroke shape control information for all the characters in the character style;
   wherein the set of stroke shape control information includes removing all the angle and thickness data under the stroke level and add new data at the character style;
   wherein the set of stroke shape control information includes each character can be restored without the angle and thickness information at the character level;
   obtaining stroke shape control information having the independent basic horizontal and vertical strokes, and other stroke shape control information expressed as horizontal and vertical stroke widths and functions of character height and width.

2. The representation method of font information of claim 1, wherein variants of one primary character style have font information of a primary character style, and said set of stroke shape control information is set for each variant.

3. The representation method of font information of claim 1, wherein stroke information of each stroke has skeleton point widening type information, and said stroke shape control information has a skeleton point number of each type of stroke.

4. The representation method of font information of claim 1, wherein stroke information includes follow-up information of stroke end points, said follow-up information having follow-up type identification, an order number of strokes being followed up, and said order number of points being followed up; and said stroke shape control information having a skeleton point number of each stroke.

5. The representation method of font information of claim 1, wherein a combination of many strokes is represented as a composite stroke, and a stroke group with a similar range is represented as a composite stroke.

6. The representation method of font information of claim 1, wherein a standardly formed font is represented with character element reference information, font formation information and character element activity information, wherein activity information and font edge concavity-convexity information are included; and for each character base activity information can be either an activity coefficient or a dimension.

7. The representation method of font information of claim 1, wherein character style information includes non-linear scaling information of stroke width, and said non-linear scaling information of the stroke width may be a stroke width scaling coefficient table based on font scaling proportion, font activity coefficient and font dimension.

8. The representation method of font information of claim 6, wherein character style information releases non-linear scaling information of stroke width, and said non-linear scaling information of the stroke width may be a stroke width scaling coefficient table based on the font scaling proportion, font activity coefficient and font dimension.

9. A font restoration method for scaling skeleton points of each stroke and determining stroke position of a font comprising the following steps of:
   determining widths of horizontal and vertical strokes and shape control parameters of each stroke according to present horizontal and vertical scaling proportions of a font, primary width of horizontal and vertical strokes of the font, and functional relationship in character height or width and stroke shape control information;
   wherein the set of stroke shape control information includes removing all the angle and thickness data under the stroke level and add new data at the character style;
   wherein the set of stroke shape control information includes each character can be restored without the angle and thickness information at the character level;
   obtaining stroke basic outline control points according to the shape control parameters and skeleton point position of a stroke;
   determining stroke tip outline control points and restoring the stroke according to stroke tip type information of the stroke and stroke shape control parameters.

10. The font restoration method of claim 9, including the step of selecting corresponding stroke shape control information according to primary character style which the font belongs to and using the stroke shape control information for font restoration.

11. The font restoration method of claim 9, including the step of adjusting stroke skeleton points according to the stroke thickness difference, or according to the stroke thickness difference plus the skeleton follow-up information from stroke infornation, when widening stroke thickness.

12. The font restoration method of claim 9, including the step of determining location follow-up skeleton points using skeleton point follow-up information from stroke information.

13. The font restoration method of claim 9, including the step of obtaining skeleton point and stroke type of other strokes for composite strokes expressed by other strokes, according to skeleton point stroke shape control parameters and stroke tip type information, and restoring each stroke according to the obtained parameter for each stroke; and avoiding characters merging together and non-isometric problems for each isometric type of composite stroke.

14. The font restoration method of claim 9, which is characterized by the following: obtaining the position and size of each character element using the character element activity coefficient proportion method; adjusting the position and size of the character elements using the character edge concavity-convexity information; and eventually obtaining the stroke information of each character element and each stroke as well as the space occupation coefficient or dimension of the font.

15. The font restoration method of claim 9, which is characterized by determining the present stroke width scaling proportion and the stroke width adjustment coefficient using the present horizontal and vertical scaling proportions, space occupation information and non-linear stroke width scaling information of the font, and determining the present horizontal and vertical stroke widths; said space occupation information may be the dimension or the space occupation coefficient of the font. The said stroke non-linear width scaling information may be the stroke width scaling coefficient table based on the font scaling proportion, the font space occupation coefficient or the font dimension.

16. The font restoration method of claim 9, which is characterized by establishing an independent stroke production process for each stroke, establishing a set of stroke production process for each primary character style, and restoring the stroke by selecting an corresponding stroke production process according to the present character style and the type identification of the stroke.

17. The font restoration method of claim 14, which is characterized by determining the present stroke width scaling proportion and the stroke width adjustment coefficient using the present horizontal and vertical scaling proportions, space occupation information and non-linear stroke width scaling information of the font, and determining the present horizontal and vertical stroke widths; the said space occupation information may be the dimension or the space occupation coefficient of the font; said stroke non-linear width scaling information may be the stroke width scaling coefficient table based on the font scaling proportion, the font space occupation coefficient or the font dimension.

* * * * *